US012670764B2

(12) United States Patent
Jadeja et al.

(10) Patent No.: US 12,670,764 B2
(45) Date of Patent: Jun. 30, 2026

(54) AUTOMATED PIXEL REFRESH MODE FOR ORGANIC LIGHT-EMITTING DIODE DISPLAYS USED IN CONTINUOUS-USE CONTEXTS

(71) Applicant: Aristocrat Technologies, Inc., Las Vegas, NV (US)

(72) Inventors: Rajendrasinh Jadeja, Las Vegas, NV (US); Michael Baum, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 368 days.

(21) Appl. No.: 18/474,074

(22) Filed: Sep. 25, 2023

(65) Prior Publication Data

US 2024/0112531 A1 Apr. 4, 2024

Related U.S. Application Data

(60) Provisional application No. 63/377,698, filed on Sep. 29, 2022.

(51) Int. Cl.
*G07F 17/32* (2006.01)
*G09G 3/3208* (2016.01)

(52) U.S. Cl.
CPC ....... *G07F 17/3223* (2013.01); *G09G 3/3208* (2013.01)

(58) Field of Classification Search
CPC .......................... G07F 17/3223; G09G 3/3208
See application file for complete search history.

(56) References Cited

U.S. PATENT DOCUMENTS

| | | | | |
|---|---|---|---|---|
| 7,317,430 | B2 | 1/2008 | McKay | |
| 11,164,540 | B2 | 11/2021 | Holland | |
| 11,276,369 | B2 | 3/2022 | Jung | |
| 11,361,729 | B2 | 6/2022 | Chappalli | |
| 2007/0243928 | A1* | 10/2007 | Iddings | G07F 17/3223 463/26 |
| 2008/0200233 | A1 | 8/2008 | Aida | |

OTHER PUBLICATIONS

Alienware AW3423DW "OLED Panel Maintenance", 2021, reddit.com, downloaded on Nov. 15, 2025, available at <<https://www.reddit.com/r/Monitors/comments/t8uoep/alienware_aw3423dw_oled_panel_maintenance/>>. (Year: 2021).*

* cited by examiner

*Primary Examiner* — Werner G Garner
(74) *Attorney, Agent, or Firm* — Weaver Austin Villeneuve & Sampson LLP

(57) ABSTRACT

Systems and techniques are disclosed for managing and preventing OLED screen burn-in for devices that are generally in an always-on state, operating on a continuous basis for extended periods of time, e.g., weeks or months.

18 Claims, 13 Drawing Sheets

AUTOMATED PIXEL REFRESH MODE FOR ORGANIC LIGHT-EMITTING DIODE DISPLAYS USED IN CONTINUOUS-USE CONTEXTS

RELATED APPLICATION

This application claims benefit of priority under 35 U.S.C. §119(e) to U.S. Patent Application No. 63/377,698, filed Sep. 29, 2022, and titled "AUTOMATED PIXEL REFRESH MODE FOR ORGANIC LIGHT-EMITTING DIODE DISPLAYS USED IN CONTINUOUS-USE CONTEXTS," which is hereby incorporated herein by reference in its entirety and for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In some games of chance, e.g., slot-type games, there may be certain symbols that, when displayed (or when at least a certain number of them are displayed) as part of a game outcome cause awards specific to each such symbol to be awarded to the player. Such symbols are typically referred to as "cash-on-reel" symbols.

Modern electronic gaming machines typically include one or more large-format, high-resolution flat-panel displays that are used to display graphics for the games provided thereby. Similar displays may also be used for other purposes in venues in which such electronic gaming machines are located, e.g., for signage or multimedia display purposes. In either case (use in electronic gaming machines or in other devices in such venues), such displays may be in constant, uninterrupted use for extended periods of time, e.g., months. For example, even when an electronic gaming machine is not actively being used by a player, the display(s) thereof may still be in constant use displaying "attract" mode graphics to entice potential passers—by into playing the game(s) that are offered.

SUMMARY

Modern electronic gaming machines may utilize any of a variety of different display technologies for providing graphical output in association with the gaming experience that they provide. One type of displays that would seem to be particularly well-suited for use in electronic gaming machines are organic light-emitting diode (OLED) displays, which use a large array of polymer-based light-emitting diodes to provide pixel-based light sources that are individually controllable for color and brightness. Such displays are able to be implemented over large areas and/or on flexible substrates, making them ideally suited for use in electronic gaming machines, which typically feature large, unbroken display areas that, in some cases, are shaped or contoured into curved or wavy profiles for aesthetic or ergonomic reasons. Since each pixel in an OLED display generates its own light, there is no need for a separate backlight to be provided to illuminate the pixels from behind (as would be the case in, for example, a liquid-crystal display). This allows OLED displays to have exceptional "black" pixel performance, i.e., pixels that are intended to show the color black are controlled to simply emit no light at all, or only a minimal amount of light, thereby transmitting no light or only minimal light. In contrast, in a display that uses a backlight, the backlight generally illuminates all of the pixels en masse such that all pixels receive generally the same amount of illumination-"black" pixels must then attenuate or block that light in order to prevent it from being seen. For technical reasons, it is almost never possible to completely block or attenuate such light, resulting in regions of such displays that show "black" showing more of a dark grey color.

OLED displays also offer superior dynamic range, offering high color and brightness contrast between pixels, thereby allowing for the presentation of high-quality graphics.

In the context of casino gaming, players seek out gaming experiences that couple rewarding game play with a high-quality multimedia experience. Since OLED displays offer far superior image reproduction and color/brightness range over other types of displays, such as liquid crystal displays, OLED displays would appear to be ideal for use in electronic gaming machines. However, OLED displays do suffer from a limitation that presents issues, particularly in the context of a casino gaming environment. Since the light-emitting elements in OLED displays are organic materials (polymers), they degrade over time in response to use. Such degradation manifests itself in several ways, but the most noticeable (and potentially damaging one) is screen burn-in, in which pixels that are kept on in the same state for very long periods of time may, in effect, remain on to some extent even when they are supposed to be off (or emit some other color or intensity of light than what they are supposed to emit). Thus, if an OLED display (or portion thereof) is used to display the same image (or portion of an image) for extended periods of time, the pixels that are used to display that image or portion thereof may "burn in" that image or portion thereof such that when the OLED display is caused to display other content, the burned-in image may still be visible to some degree while the other content is displayed. This can be extremely distracting and ruins the visual experience of onlookers.

A typical electronic gaming machine in a casino environment often operates continuously all day (and night) long, seven days a week, and 365 days a year. Electronic gaming machines are expensive to procure and maintain, and casinos will typically seek to have electronic gaming machines ready and available for play at all times in the event that a potential player shows up and wishes to play on an electronic gaming machine, thereby potentially generating revenue for the casino and maximizing the operator's return on the investment that each electronic gaming machine represents. For the same reason, casinos also tend to operate at all hours of the day, including in the middle of the night and early morning. Because of this, the displays used in electronic gaming machines are typically kept on continuously, either displaying graphical content relating to play of the game or games by a player (when the electronic gaming machine is in active use by a player) or displaying graphical content relating to the game or games provided by the electronic gaming machine, e.g., an attract screen, perhaps showing example game play, animations, etc., that may draw interested passersby to engage with the electronic gaming machine and potentially begin playing. Due to the nature of how games of chance offered by electronic gaming machines are typically designed, there are often regions of the graphical user interface that display the same content for extended periods of time, e.g., in a slot-type game of chance, the symbols shown in each symbol position may change/move regularly, but the surrounding artwork, such as borders for the reels, surrounding thematic elements, embellishments or frames around credit counters, bonus displays, etc., may remain relatively static from play to play, thereby presenting a very real risk of screen burn-in of such content if OLED displays were to be used in such electronic gaming machines.

Devices such as OLED televisions and monitors are often designed to be able to be placed into a mode where a "pixel refresh" routine may be performed. The pixel refresh routine is performed while the OLED display is off or in a standby mode (although while power is still provided to the electronics of the OLED display), and it is not possible to display graphical content on the OLED display while the pixel refresh routine is being performed. It will be understood that "graphical content" in this context refers to image data that is provided to the OLED display by an external source, e.g., by a video card or adapter of a computer or by a video signal provided from a multimedia device such as a digital video disc player. There may still be some graphical artifacts that appear on an OLED display during the pixel refresh routine; these graphical artifacts are not, for the purposes of this disclosure, considered to be "graphical content." For example, in some pixel refresh routines, the OLED screen may be effectively off except for a line of pixels that are turned on; this line of pixels may scan across the screen during the pixel refresh routine, but this is not considered "graphical content" in the context of this disclosure.

OLED televisions and monitors that have pixel refresh functionality are designed to engage the pixel refresh routine after they have been powered off. For example, some OLED televisions keep track of the cumulative time that the television has been "on" since the last time the pixel refresh routine was performed. Such televisions may then, each time they are turned off, check to see if that cumulative time exceeds a predetermined amount, e.g., four hours. If so, then the pixel refresh routine is then performed after the television is turned off. Such a system works relatively well for OLED displays that are used in devices that are not in 24/7, continuous use, e.g., that are usually turned on and off at least once a day. However, since electronic gaming machines can operate for weeks or months at a time without being powered off (or, more technically, without the displays being turned off), such an approach to an anti-burn-in prevention mechanism will be ineffective.

To address this technical issue, the present inventors conceived of a technical solution in which an apparatus that uses an OLED display or displays and is designed to be used in a continuous-use context (operating routinely for periods of time far longer than the typical interval between when a pixel refresh routine would be performed, e.g., such as an electronic gaming machine in a casino gaming environment) may be configured to switch from a mode in which the OLED display(s) are used to present graphical content, e.g., as may be supplied by a video adapter of an electronic gaming machine, to a mode in which a pixel refresh routine is performed and then switch back to the mode in which the graphical content is displayed after completion of the pixel refresh routine. Such mode-switching may be schedule-driven so that such mode switches occur during a time of day where a temporary cessation of the display of graphical content on the OLED display will have minimal impact. This allows the "uptime" of the OLED displays (the time in which the OLED displays are displaying the graphical content) to be generally maximized while still allowing pixel refresh routines to be performed on a regular basis in order to prevent screen burn-in and prolong the lifetime of the OLED display(s).

In some implementations, an electronic gaming machine may be provided that includes a main cabinet, a first organic light-emitting diode (OLED) display, the first OLED display configured to be operable in at least a first mode in which graphical content is displayed by the first OLED display and a second mode in which a first pixel refresh routine is performed, one or more processors, and one or more memory devices. The one or more memory devices may store computer-executable instructions which, when executed by the one or more processors, cause the one or more processors to cause an instance of game play of a gaming application to occur responsive, at least in part, to a game play input signal received by the one or more processors; cause the first OLED display to, while operating in the first mode, display first graphical content; determine whether a set of one or more temporal conditions have been met; cause, responsive, at least in part, to at least the set of one or more temporal conditions being met, the first OLED display to transition from the first mode in which the first OLED display is displaying the first graphical content to the second mode; and cause the first OLED display to transition back to the first mode to further display the first graphical content responsive to a determination that the performance of the first pixel refresh routine is complete or responsive to receipt of an interface input signal by the one or more processors while the first pixel refresh routine is being performed.

In some such implementations, the one or more memory devices may further store additional computer-executable instructions which, when executed by the one or more processors, cause the one or more processors to determine that the performance of the first pixel refresh routine is complete based on an amount of time elapsed since the first pixel refresh routine was caused to be performed.

In some other such implementations, the one or more memory devices may further store additional computer-executable instructions which, when executed by the one or more processors, cause the one or more processors to determine that the performance of the first pixel refresh routine is complete by: determining that a predetermined period of time has elapsed since the first OLED display was caused to transition from the first mode in which the first OLED display was displaying the first graphical content to the second mode in which the first pixel refresh routine is performed by the first OLED display. The predetermined period of time may be at least as long as a duration of the first pixel refresh routine and less than 1.1 times the duration of the first pixel refresh routine.

In some implementations, the one or more memory devices may further store additional computer-executable instructions which, when executed by the one or more processors, cause the one or more processors to determine that the performance of the first pixel refresh routine is complete based on receipt of a signal generated by the first OLED display indicating that the first pixel refresh routine is complete.

In some implementations, the electronic gaming machine may include a second OLED display that is configured to be operable in at least a third mode in which graphical content is displayed by the second OLED display and a fourth mode in which a second pixel refresh routine is performed by the second OLED display. In some such implementations, the one or more memory devices may further store additional computer-executable instructions which, when executed by the one or more processors, cause the one or more processors to cause second graphical content to be displayed on the second OLED display while the second OLED display is operating in the third mode; cause, based at least on the set of one or more temporal conditions being met, the second OLED display to transition from the third mode in which the second OLED display is displaying the second graphical content to the fourth mode such that the performance of the first pixel refresh routine and the second pixel refresh routine overlap at least partially in time; and cause the second OLED display to transition back to the third mode to further display the second graphical content after the performance of the second pixel refresh routine is determined to be complete or responsive to receipt of the interface input signal by the one or more processors while the second pixel refresh routine is being performed.

In some implementations, the electronic gaming machine may further include a second display. In such implementations, the one or more memory devices may further store additional computer-executable instructions which, when executed by the one or more processors, cause the one or more processors to cause the second display to display a message associated with the performance of the first pixel refresh routine and while the first pixel refresh routine is being performed.

In some such implementations, the message may include information that indicates, directly or indirectly, approximately how long until the first OLED display will be transitioned back into the first mode from the second mode, and the one or more memory devices may further store additional computer-executable instructions which, when executed by the one or more processors, cause the one or more processors to update the message on a continuous or periodic basis while the first OLED display is in the second mode.

In some further or additional such implementations, the message may also include content that directly or indirectly indicates that the first OLED display can be restored to the first mode in which the first graphical content is displayed by providing an input via the button deck.

In some implementations, the set of one or more temporal conditions may be met when a first time of day in the time zone in which the electronic gaming machine is located is a time between 2:00 in the morning and 6:00 in the morning in that time zone.

In some implementations, the electronic gaming machine may further include one or more proximity sensors, and the one or more memory devices may further store additional computer-executable instructions which, when executed by the one or more processors, cause the one or more processors to determine whether a set of one or more proximity conditions have been met based on data received from the one or more proximity sensors, and cause, responsive, at least in part, to the set of one or more proximity conditions being met in association with the set of one or more temporal conditions being met, the first OLED display to transition from the first mode in which the first OLED display is displaying the first graphical content to the second mode.

In some such implementations, the set of the one or more proximity conditions may be met, at least in part, when data from the one or more proximity sensors indicates that less than a threshold number of people are within a first area associated with the electronic gaming machine.

In some implementations, the set of the one or more proximity conditions may be met, at least in part, when data from the one or more proximity sensors indicates that no people are within a first area associated with the electronic gaming machine.

In some such implementations, the set of the one or more proximity conditions may be met, at least in part, when data from the one or more proximity sensors indicates that no people are within eight feet of the electronic gaming machine.

In some implementations, the electronic gaming machine may include one or more imaging sensors and the one or more memory devices may further store additional computer-executable instructions which, when executed by the one or more processors, cause the one or more processors to determine whether a set of one or more imaging conditions have been met based on data received from the one or more imaging sensors; and cause, responsive, at least in part, to the set of one or more imaging conditions being met in association with the set of one or more temporal conditions being met, the first OLED display to transition from the first mode in which the first OLED display is displaying the first graphical content to the second mode.

In some implementations, the set of one or more imaging conditions may be met when data from the one or more imaging sensors indicates that less than a threshold number of people within a first area have faces oriented towards the electronic gaming machine.

In some implementations, the set of one or more imaging conditions may be met when data from the one or more imaging sensors indicates that no people within a first area are looking at the electronic gaming machine.

In some implementations, the one or more memory devices may further store additional computer-executable instructions which, when executed by the one or more processors, cause the one or more processors to cause, responsive to the first OLED display being caused to transition from the second mode to the first mode responsive to the receipt of the interface input signal while the first pixel refresh routine is being performed and to determining that a set of one or more pixel refresh restart conditions are met, the first OLED display to transition from the first mode back to the second mode in order to restart the first pixel refresh routine.

In some implementations, the set of one or more pixel refresh restart conditions may be met, at least in part, when a determination is made by the one or more processors that the electronic gaming machine is not in use by a player.

In some implementations, the one or more memory devices may further store additional computer-executable instructions which, when executed by the one or more processors, cause the one or more processors to cause, responsive to the first OLED display being caused to transition from the second mode to the first mode responsive to the receipt of the interface input signal while the first pixel refresh routine is being performed and to determining that a set of one or more pixel refresh restart conditions are met, the first OLED display to transition from the first mode back to the second mode in order to perform more of the first pixel refresh routine.

In some implementations, the set of one or more pixel refresh restart conditions may be met, at least in part, when a determination is made by the one or more processors that the electronic gaming machine is not in use by a player.

Additional implementations are contemplated beyond those listed above, including, for example, implementations of the various examples provided above in the context of methods carried out by one or more processors, as well as non-transitory, computer-readable media storing computer-executable instructions which, when executed by one or more processors, cause the one or more processors to implement such methods.

The Figures are provided for the purpose of providing examples and clarity regarding various aspects of this disclosure and are not intended to be limiting.

DETAILED DESCRIPTION

As discussed above, this disclosure is directed at systems for managing performance of pixel refresh routines for OLED displays in devices or systems that may be in an always-on state for extended periods of time, e.g., weeks or months. Examples of such systems include electronic gaming machines used in casino gaming environments; the following discussion is provided to give an overview of such devices and systems. A more in-depth discussion of the pixel refresh routine management aspects of this disclosure then follows.

Figure 1:
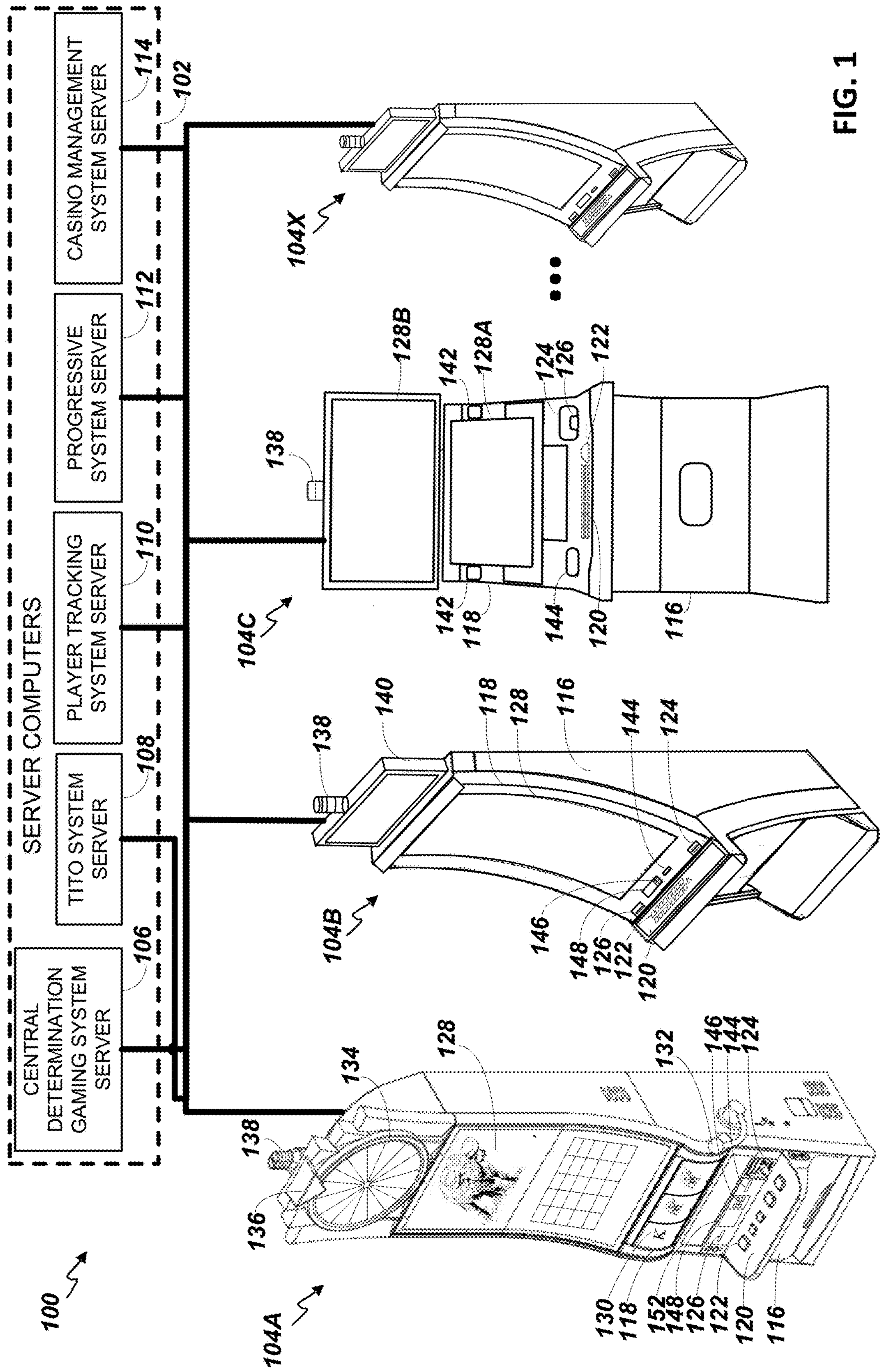
FIG. 1 is an exemplary diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and) Bluetooth®, cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
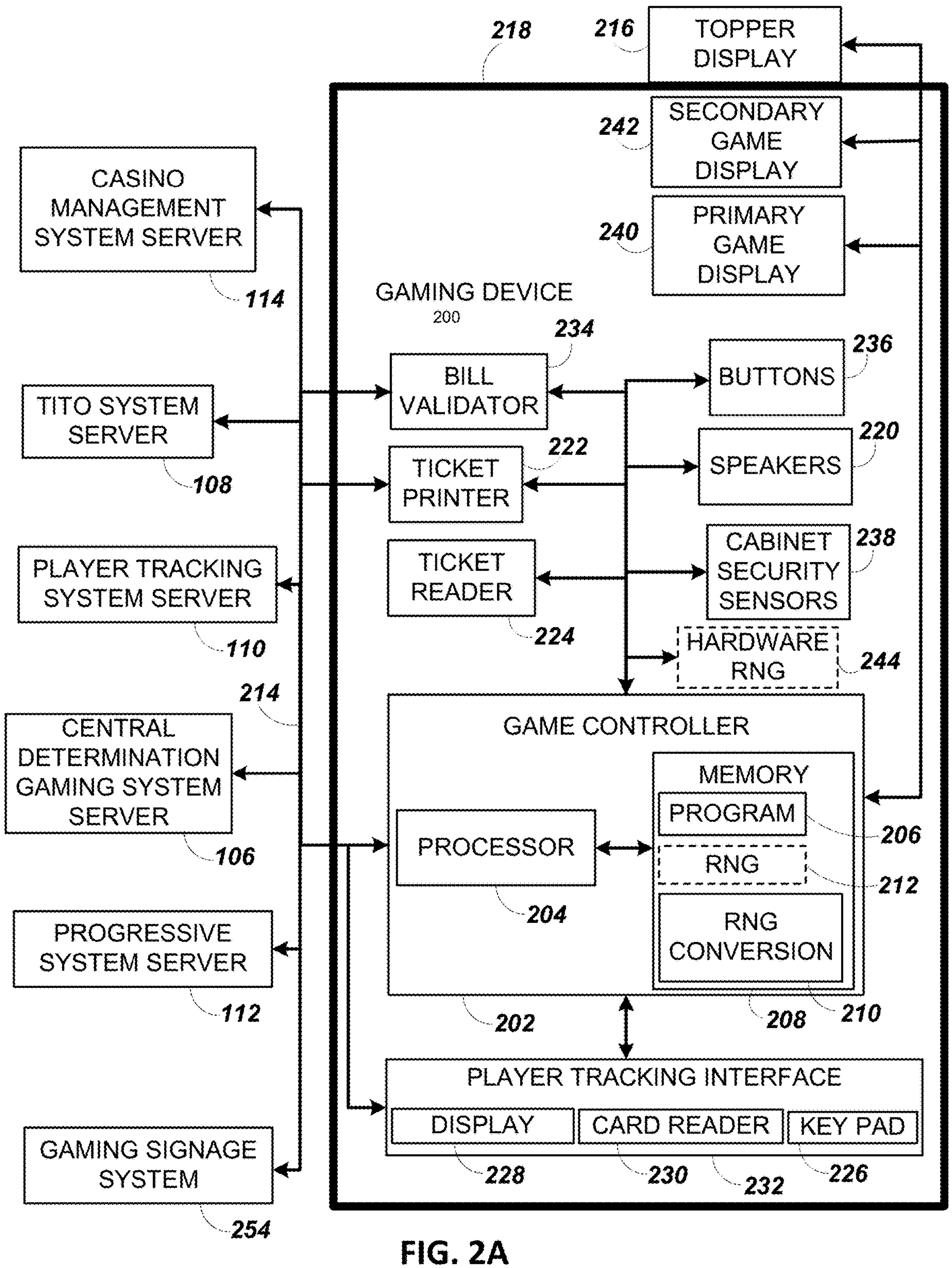
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat®

Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
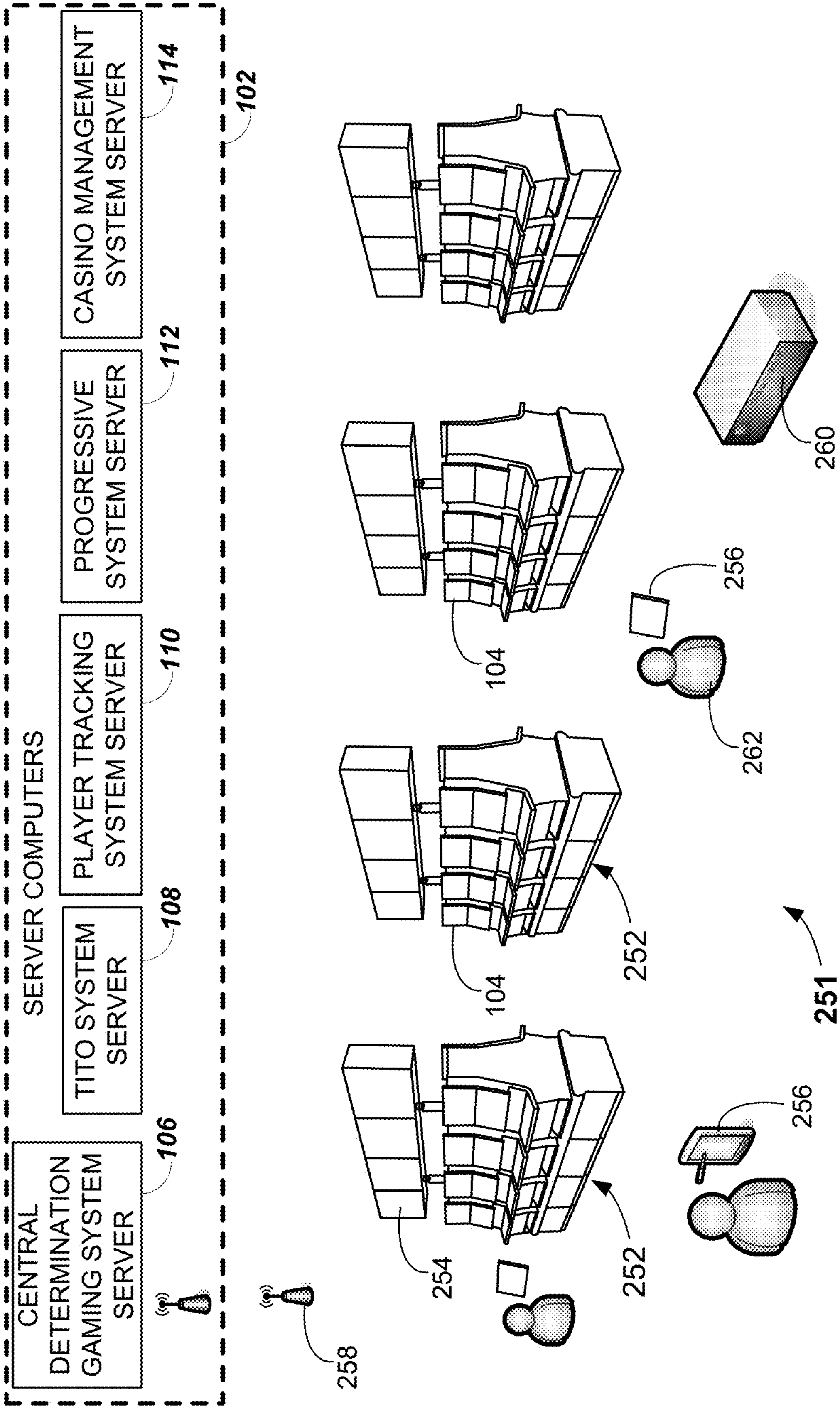
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
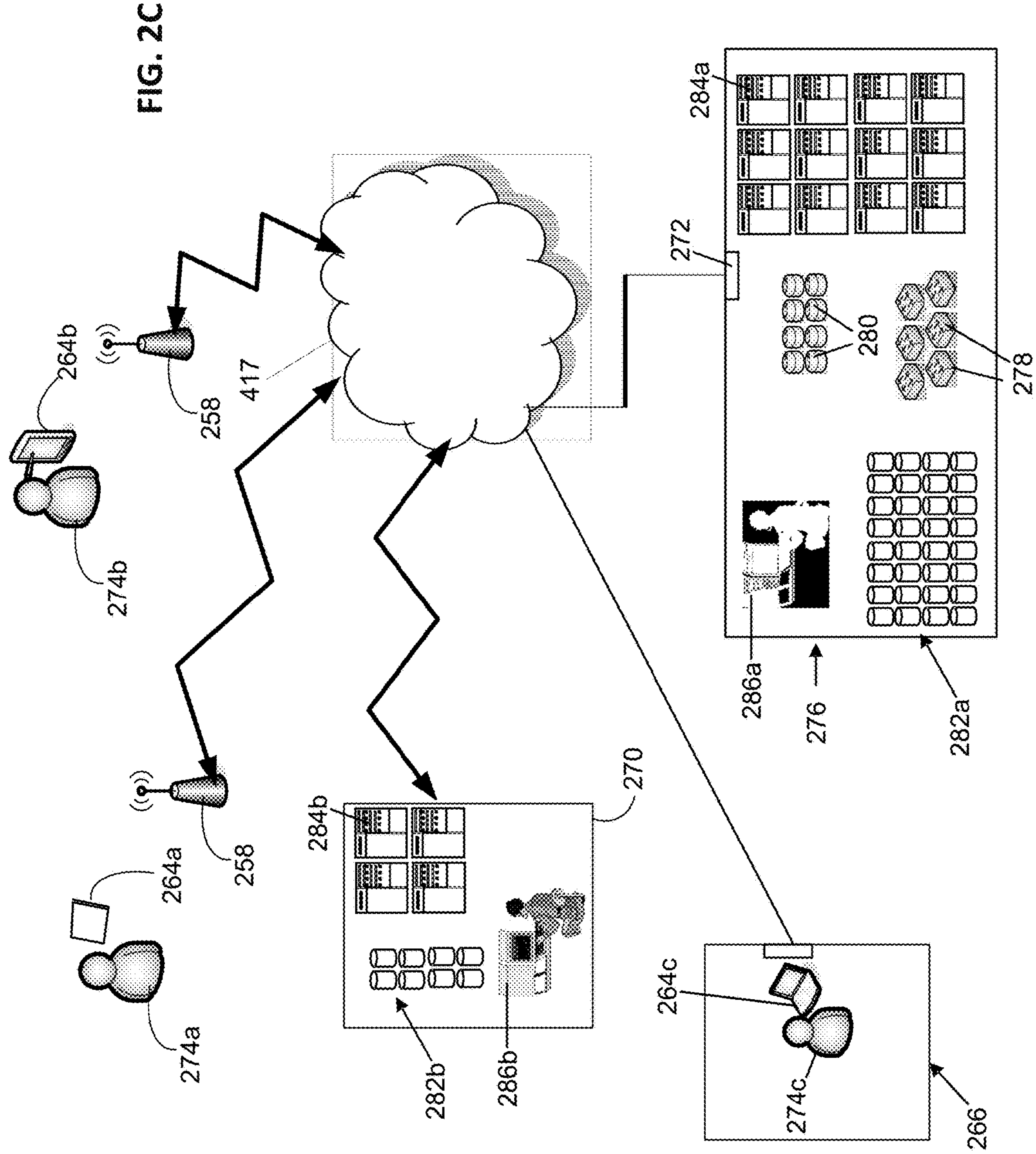
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
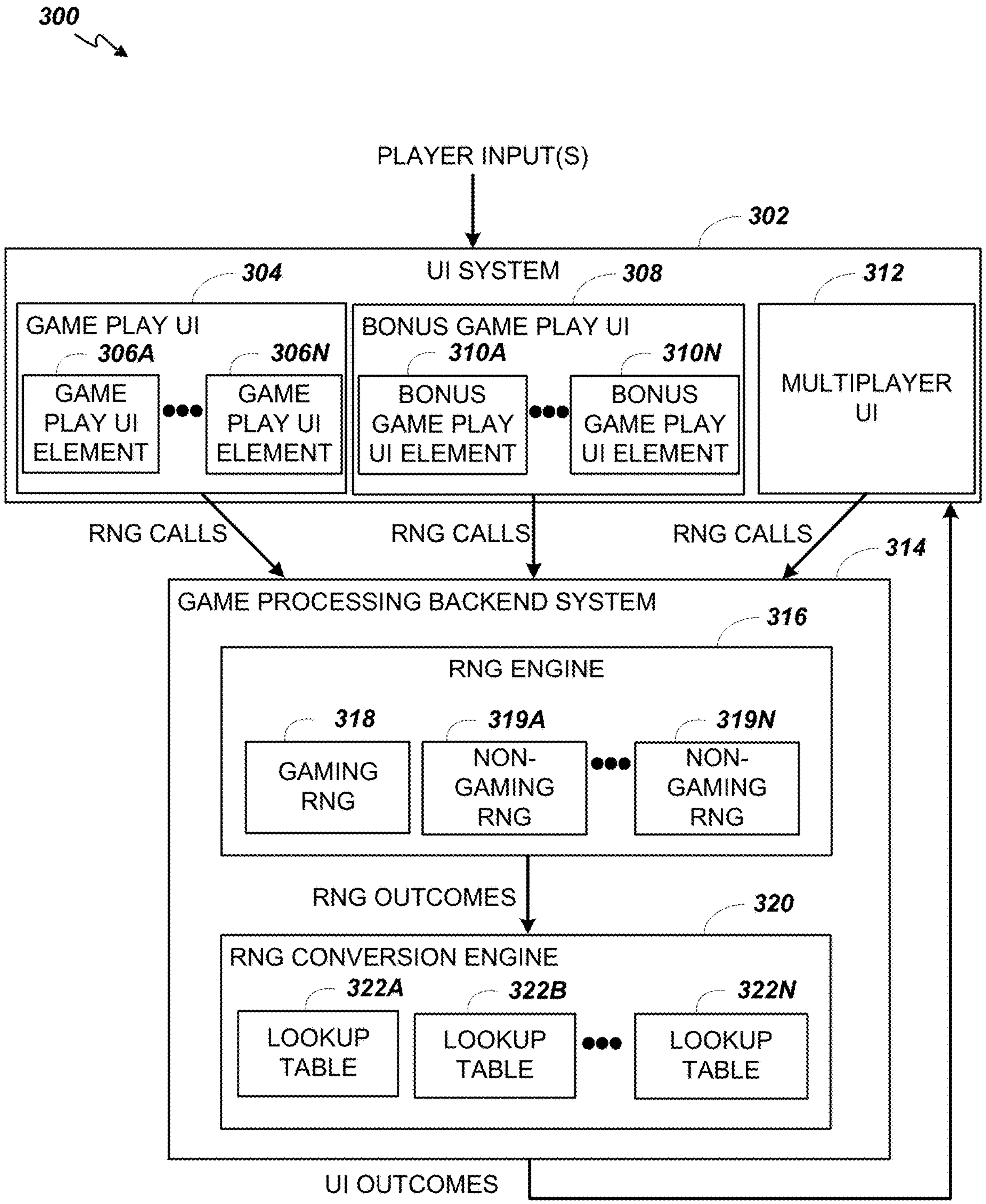
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

As discussed above, one type of display device (the term "display device" or "display" is used herein to refer to a pixel-based display system that is configured to depict graphical content provided by way of a signal from an external source, e.g., a video adapter or controller) that may be used in electronic gaming machines is an OLED display (also sometimes referred to an OLED screen, OLED display panel, OLED panel, etc.). OLED displays feature an array, usually rectangular but also potentially in other formats, of pixels, each pixel typically having a plurality of individually controllable LED elements in it of different colors, e.g., red, green, and blue. Such LEDs use organic materials that emit light when subjected to an electric current. OLED displays may be offered in a variety of formats, including passive-matrix OLEDs (PMOLEDs) and active-matrix OLEDs (AMOLEDs), as well as other variants, such as flexible OLEDs or transparent OLEDs.

As noted previously, such organic light-emitting materials degrade with use, resulting in screen burn-in issues in OLED displays. To address such issues, OLED manufacturers have developed pixel refresh routines that may be performed by OLED displays in order to "reset" or "refresh" the pixels such that they are all at a calibrated baseline level of operation after the pixel refresh routine is complete, thereby preventing the screen burn-in effect from becoming noticeable and/or permanent. As noted earlier, televisions and computer monitors that use OLEDs may automatically activate a pixel refresh routine when the television or monitor is turned off (e.g., such that the television or monitor no longer shows graphical content from an external source but the electronics of the television or monitor are still provided power and can perform background tasks, such as conducting the pixel refresh routine) and the total cumulative time elapsed since the last time the pixel refresh routine was performed exceeds some threshold amount, e.g., four hours. The performance of the pixel refresh routine may take between, for example, several minutes to an hour. For example, some televisions may perform a 10-minute long pixel refresh routine when turned off if the total cumulative "on" time for the television elapsed since the last time that pixel refresh routine was performed exceeds four hours but may also perform a different, 60-minute long pixel refresh routine when turned off if the total cumulative "on" time for the television elapsed since the last time that pixel refresh routine was performed exceeds two thousand hours. Thus, the general practice in devices such as televisions and monitors is to a) perform the pixel refresh routine after a user has turned off the device housing the OLED display and b) only perform the pixel refresh routine in (a) if the total amount of time that the OLED has been in use (displaying graphical content) since the last time the pixel refresh routine was performed exceeds some threshold amount. Pixel refresh routines, it is noted, are not without cost—each time they are performed, they degrade the lifespan of the OLED panel somewhat. This, coupled with the time it takes to perform pixel refresh routines, is why televisions and monitors that use OLED displays only perform the pixel refresh mode after the total cumulative amount of time that the OLED display has been on since the last pixel refresh routine was performed exceeds some threshold level (to avoid unnecessary damage to the OLED) and so as to not interrupt active use of the television or computer monitor.

In devices such as electronic gaming machines, e.g., cabinet-based slot machines or other systems that are designed to be located in a continual-use environment such as a casino, the pixel refresh solutions that may work for televisions or monitors may not be appropriate since such devices (and the OLED displays inside them) are, from a practical perspective, never turned off (typically operating continuously for weeks or months in between power-down events) since they are continuously visible to passersby and players of the electronic gaming machine.

As noted earlier, the present inventors conceived of a pixel refresh routine management system in which such a device may be configured to cause the OLED display or displays inside of it to automatically transition from a first mode in which the OLED display(s) depicts graphical content provided via, for example, a signal generated by a video adapter, to a second mode in which a pixel refresh routine is performed and to then transition back to the first mode either on completion of the pixel refresh routine or at some point in time after the performance of the pixel refresh routine is expected to have completed (although still close in time, e.g., within 1.1 times the duration of the pixel refresh routine). Thus, the OLED display in such a system is only prevented from displaying the graphical content for a very limited interval of time during which the pixel refresh routine is performed, thereby impacting the operation of the electronic gaming machine generally as little as possible (or at least, as little as is practically feasible).

Such systems may be configured to initiate such mode transitions for their OLED displays on a particular schedule. For systems that are located in casino gaming environments, a schedule that causes such mode transitions to be initiated at a time that is, in the local time of the location where such a system may be located, in the early morning hours, e.g., between midnight and 6:00 AM, e.g., between 2:00 AM and 6:00 AM, between 2:00 AM and 4:00 AM, e.g., at 3:00 AM, may be particularly effective. For example, even though casino environments tend to be open and accessible to patrons all day and all night long, every day of the week, the early morning hours typically see a significant decrease in the number of patrons that are present and the number of electronic gaming machines that are in active use by patrons.

Such systems may also be configured to not initiate the mode transition if the system is in active use by an individual, e.g., by a player playing a game of chance on the electronic gaming machine, at the time that the mode transition is scheduled to occur. Such a system may be further configured to monitor whether the system remains in use by the player and, if the system determines that the player is no longer using the system (and that no other player is using the system), initiate the mode transition at a time after the normal scheduled start time. In some such implementations, the system may be configured to only initiate such a delayed mode transition if the mode transition initiation time falls within a particular time window (with respect to the local time of the location where the system is located). For example, such a system may be configured to initiate the mode transition at 2:00 AM but may also have a 2:00 AM to 5:00 AM time window specified during which the mode transition is allowed to occur. If this system were to determine at 2:00 AM that no player was using the system, then it would cause the mode transition to occur and the pixel refresh routine to be performed. However, if the system determines at 2:00 AM that a player is using the system, then the system may not perform the pixel refresh routine at that time and may instead monitor over time whether or not the player is still using the system. When the player ceases using the system, the system may check whether the current time is within the time window set for the system, e.g., within 2:00 AM to 5:00 AM. If it is, then the system may initiate the pixel refresh routine. If it is not, then the system may forego performing the pixel refresh routine until the next scheduled mode transition.

Figure 4:
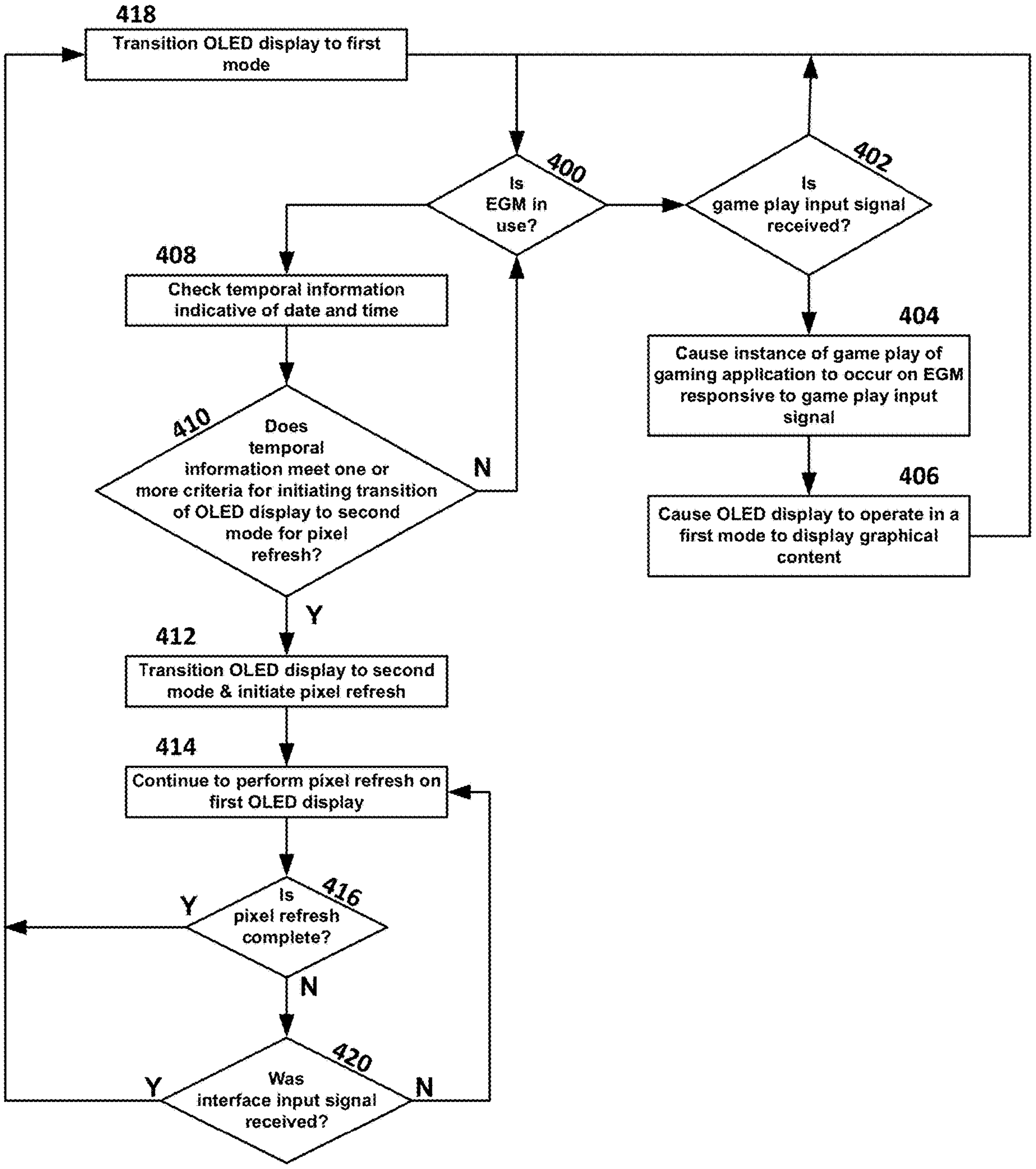
FIG. 4 depicts a block diagram of a technique for performing OLED display pixel refreshes in an electronic gaming machine.

FIG. 4 depicts a block diagram of such a technique for performing OLED display pixel refreshes in an electronic gaming machine. In FIG. 4, an electronic gaming machine may cycle through various aspects of the depicted technique over time, but the technique may, for each cycle, start with block 400, in which the electronic gaming machine may make a determination as to whether the electronic gaming machine is in use by a player. If it is determined in block 400 that the electronic gaming machine is in use by a player, the technique may proceed to block 402, in which a further determination may be made as to whether a game play input signal indicating a play of a game offered by the electronic gaming machine has been received from the button deck of the electronic gaming machine (or from some other source). If it is determined in block 402 that such a game play input signal has not been received, the technique may return to block 400. However, if it is determined in block 402 that the game play input signal has been received, then the technique may proceed to block 404, in which an instance of game play of a gaming application may be caused to occur responsive to receipt of the game play input signal. The electronic gaming machine may then, in block 406, cause the OLED display or displays of the electronic gaming machine to operate in the first mode to display graphical content for the gaming application before returning to block 400. Thus, blocks 400 through 406 may be repeatedly cycled through during a player's game play session on the electronic gaming machine.

However, if it is determined in block 400 that the electronic gaming machine is no longer in use by a player, the technique may instead proceed to block 408, in which the electronic gaming machine may check temporal information, e.g., the date and time or an elapsed amount of time since some prior event, such as the most recently completed pixel refresh routine for a given OLED display of the electronic gaming machine. The technique may then proceed to block 410, in which a determination may be made as to whether the temporal information meets one or more criteria, e.g., one or more temporal conditions, for triggering or initiating a transition of the OLED display from the first mode to the second mode (thus causing a pixel refresh routine to be performed). Such temporal conditions may, for example, be the time of day being within a certain range of times, the time of day being within a certain range of times plus the time since the electronic gaming machine was last used by a player being greater than five minutes, etc. If it is determined in block 410 that the one or more criteria for initiating a transition to the second mode are not met, then the technique may return to block 400. However, if it is determined in block 410 that the one or more criteria for initiating a transition to the second mode are met, then the technique may proceed to block 412, in which the OLED display may be caused to transition to the second mode, thus initiating the pixel refresh routine on the OLED display.

In block 414, the pixel refresh initiated in block 412 may continue to be performed. In block 416, a determination may be made as to whether or not the pixel refresh routine has completed. If it is determined in block 416 that the pixel refresh routine is complete, the technique may proceed to block 418, in which the OLED display is caused to transition back to the first mode, before proceeding to return to block 400. However, if it is determined in block 416 that the pixel refresh routine is not yet complete, the technique may proceed to block 420, in which a determination may be made as to whether or not an interface input signal has been received via the button deck. Such an interface input signal may, for example, be generated when a player pushes a button or taps a touch-screen control on the button deck, thereby signaling that a player potentially wishes to play on the electronic gaming machine. In other or additional such implementations, the interface input signal may be received from a device or system separate from the button deck, e.g., a mobile device (such as a smartphone or tablet) that is separate from the electronic gaming machine and used by the player to indicate a desire to play a game on the electronic gaming machine. For example, a smartphone carried by a player may have an app installed that allows the player to communicate with a specific, or nearby, electronic gaming machine and, for example, indicate a desire to play a game on that electronic gaming machine. In such an event, the electronic gaming machine may, for example, display a welcome message to that player and indicate that it is reserved for use by that player and will not allow other players to initiate a gaming session on it at the present time. Thus, the interface input signal may result from an interaction of a player with an interface of the electronic gaming machine itself or may originate from another device with an interface of some sort that the player may use to indicate a desire to initiate play on the electronic gaming machine. In some implementations, the interface input signal may arise from an aspect of the electronic gaming machine-player interface that is not necessarily evident to, or consciously interacted with by, the player. For example, the electronic gaming machine may have a proximity sensor that may detect when a person is near the electronic gaming machine, a weight or pressure sensor that may detect when a person is sitting on a chair that may be part of the electronic gaming machine or may detect when a person is standing on a portion of the base of the electronic gaming machine that may protrude out from the bottom of the electronic gaming machine to provide a slightly elevated platform on which players may stand during play. It will be appreciated that the interface input signal may, in some cases, be generated in the same manner as the game play input signal, e.g., the player may press a "play" button on the electronic gaming machine—when the electronic gaming machine is in a state where game play is being provided, the signal generated by such a button press may be treated by the electronic gaming machine as the game play input signal, but when the electronic gaming machine is in a state where an OLED display is in the second mode, the signal generated by such a button press may be treated by the electronic gaming machine as the interface input signal. It will also be appreciated that the game play input signal, like the interface input signal, may also be generated responsive to inputs provided by a player via a remote device, such as a smartphone owned by the player. For example, in some implementations, an electronic gaming machine may be configured to allow a player to use an app on a smartphone in order to play the electronic gaming machine remotely, e.g., from their smartphone while taking a break to eat lunch at a nearby restaurant. The electronic gaming machine may, when supporting such remote play, lock out the controls of the electronic gaming machine such that other players may not interfere with the remote play of the electronic gaming machine. In such implementations, the player may press one or more touch-screen controls on the smartphone to generate game play input signals that are then sent to the electronic gaming machine in order to trigger a play of a game offered by the electronic gaming machine.

If it is determined in block 420 that the interface input signal has been received, the technique may proceed to block 418 in order to return the OLED display to the first mode before returning to block 400. If it is determined in block 420 that the interface input signal has not been received, the technique may return to block 414, thus allowing the pixel refresh routine to continue to be performed.

The one or more processors may determine whether or not a player is still using an electronic gaming machine through any of a variety of mechanisms. For example, if a player initiates a cash-out operation, e.g., such as transferring all their credits on the electronic gaming machine into a casino gaming account or requesting a credit voucher for their remaining credit balance, this may indicate that the player has finished playing on the electronic gaming machine. In another example, the one or more processors may determine that a player has stopped using the electronic gaming machine when a predetermined period of time elapses during which there are no player inputs provided, e.g., no button presses or touch-screen presses. In yet another example, the electronic gaming machine may have one or more sensors that may be used to determine if a player is engaged with the electronic gaming machine, e.g., a pressure sensor or load cell in a seat of the electronic gaming machine (if equipped with a seat) may detect when a mass—presumably a player—is positioned on the seat, an optical sensor may detect when an object (again, presumably a player) is present in front of the electronic gaming machine, a camera may obtain images of the space in front of the electronic gaming machine and use facial detection algorithms to determine whether a person is positioned in front of the electronic gaming machine and looking at the display, etc.

It will be understood that transitioning an OLED display to a second mode in which a pixel refresh routine is performed may be performed in any of a number of ways. For example, such a mode transition may, in some cases, involve causing the OLED display to change to a state where it may automatically initiate the pixel refresh routine. For example, if an OLED display is designed to automatically perform a pixel refresh routine when placed into an off, standby, suspend, and/or sleep state (assuming that the requisite cumulative total "on" time since the last time the pixel refresh routine was performed exceeds any threshold therefor that may exist), then transitioning to the second mode may be accomplished by causing the OLED display to transition to an off, standby, suspend, and/or sleep state after the OLED display has been on, for example, for at least the threshold cumulative "on" time that the OLED display requires before it will initiate the pixel refresh routine. Such a mode transition may be thought of as indirectly initiating the second mode. Such a mode transition may also be directly initiated, e.g., by sending a command to the OLED display to initiate the pixel refresh routine. In some instances, e.g., if the OLED display allows for granular control of certain aspects of the display operation by an external device, e.g., the controller of the electronic gaming machine, such a mode transition may be directly initiated by sending a first command to the OLED display to cause it to cease displaying graphical content (e.g., a command to cause it to enter an off, standby, suspend, and/or sleep state) and a subsequent second command to cause it to initiate the performance of the pixel refresh routine. Transitioning an OLED display to a second mode in which a pixel refresh routine is performed will be understood to encompass any of the above techniques, as well as other techniques not disclosed here but which similarly result in a pixel refresh routine being performed.

In some instances, an OLED display may be equipped with a timing controller (T-con) board that includes one or more processors that are configured to generate horizontal and vertical timing panel signals that are needed to ensure that control signals are sent to each individual pixel of the OLED display at the correct time. The T-con board may also control what signals are sent to each pixel and that bias level is set for each pixel. The T-con board may also be configured, e.g., by an algorithm executed on one or more processors thereof, to continuously control the way power is distributed throughout the OLED pixel array so as to help reduce the application of continuous higher current levels across the OLED transistor layer that may degrade the pixels and cause burn-in effects. Such functionality may help reduce or minimize the burn-in effect.

Such OLED displays may also include an analog/digital (AD) board, e.g., that may be configured to convert and process video signals sent to the OLED display from an external source, e.g., a video adapter in an electronic gaming machine, into low-voltage signals that are sent to the T-con board. The AD board may also be configured to control the T-con board power state, e.g., to cause the T-con board to remove power from the OLED pixel array to allow a pixel refresh routine to be performed. The AD board may be configured to communicate data with a video adapter that provides it with a video signal for display; such communication may occur via a dedicated channel, e.g., using the monitor control command set (MCCS). This allows the electronic gaming machine, via the video adapter, to send commands to an OLED display that control how the OLED display operates. Such commands may, for example, cause the OLED display to change to a sleep or suspend state, wake up from a sleep state, change resolution and/or refresh rate, etc. The MCCS may also allow data from the OLED display to be communicated back to the video adapter/electronic gaming machine controller, e.g., the operational state of the display. For at least some OLED displays, the MCCS may include commands that may be sent to the AD board that may cause the AD board to trigger the pixel refresh routine. In some such implementations, the MCCS may also include commands or messages that may be sent from the AD board back to the video adapter/electronic gaming machine to inform it of the successful completion of the pixel refresh routine.

The AD board may also be configured to continue to receive a video signal from the video adapter during periods of time in which the T-con board and/or the AD board is performing the pixel refresh routine and to send back messages to the video adapter indicating that the graphical content contained within that video signal is being displayed by the OLED display (even if the OLED display is not, in fact, displaying that content since it is performing a pixel refresh routine). This may prevent the video adapter from entering a video disconnect state, e.g., a state in which the video adapter reports to the electronic gaming machine controller that it has lost communications with the OLED display. Since most electronic gaming machines are required to enter a tilt state (error condition) if they detect a loss of video signal, such an arrangement may allow electronic gaming machines to perform pixel refresh routines without entering a tilt/error state.

Generally speaking, the above technique may involve causing, by one or more processors of an electronic gaming machine, one or more OLED displays of the electronic gaming machine to operate in a first mode to display graphical content to be displayed on the OLED displays. Such graphical content may include, for example, example game-play animations, advertising content, instructions on how to play, "lobby" GUIs that depict different games that may be available to play on the electronic gaming machine, etc. The electronic gaming machine may, it will be understood, be operable to cause one or more instances of game play for at least a first gaming application to occur responsive, at least in part, to receipt, by the one or more processors, of a game play input signal received from, for example, a button deck of the electronic gaming machine. Button decks, it will be understood, may refer to traditional button decks that feature a plurality of physical buttons that may be operated by a player to generate input signals in order to cause various game-play related functions to occur, e.g., setting a wagering amount, initiating a play of a game of chance, etc., as well as to virtual button decks in which the "buttons" are touch-responsive areas of a touch screen that may display user-selectable controls that, when selected, may cause such an input signal to be generated. A button deck may also be a hybrid of both physical and virtual button decks, with one or more physical buttons and one or more "virtual" buttons (provided by touch-sensitive areas of a display screen that is part of the button deck).

The technique may further involve causing, by the one or more processors, temporal information indicative of the time and date to be monitored. The one or more processors may further cause, based on the temporal information, the OLED display to transition from the first mode to a second mode in which a pixel refresh routine is performed and then, after the pixel refresh routine is determined to be completed, transition back to the first mode to continue to display the graphical content. For example, the temporal information may be monitored to see if it meets one or more criteria, e.g., a specific time of day, a number of hours since a last successful pixel refresh was performed, a number of hours since a pixel refresh was initiated but not successfully completed, etc. In some implementations, the one or more processors may also be configured to detect when one or more interface input signals are received while the OLED display is in the second mode and, if such interface input signals are received, cause the OLED display to transition back to the first mode even if the performance of the pixel refresh routine has not yet completed. This additional capability allows a potential user of the electronic gaming machine to interrupt the pixel refresh routine and restore the electronic gaming machine to a state in which OLED display(s) are operating in the first mode and displaying the graphical content again.

It will be understood that "graphical content," as the phrase is used herein, may refer to a single piece of graphical content, an animation, or, more generally, graphical output that results from a video signal provided to the OLED display(s) via a graphics adapter (such graphical output may vary over time depending on the specific operational state of the electronic gaming machine). Thus, the graphics that may be displayed on the OLED display when the OLED display is transitioned from the first mode to the second mode may not, in some cases, match the graphics that are displayed on the OLED display when the OLED display is transitioned back to the first mode from the second mode, although such graphics may still be part of the same overall graphical content. Put another way, the software that may be executing on the one or more processors to generate the graphical content may continue to execute while the OLED display is in the second mode even if the OLED display is not in an "on" state (or other state) that would allow the graphical content to be displayed.

Figure 5:
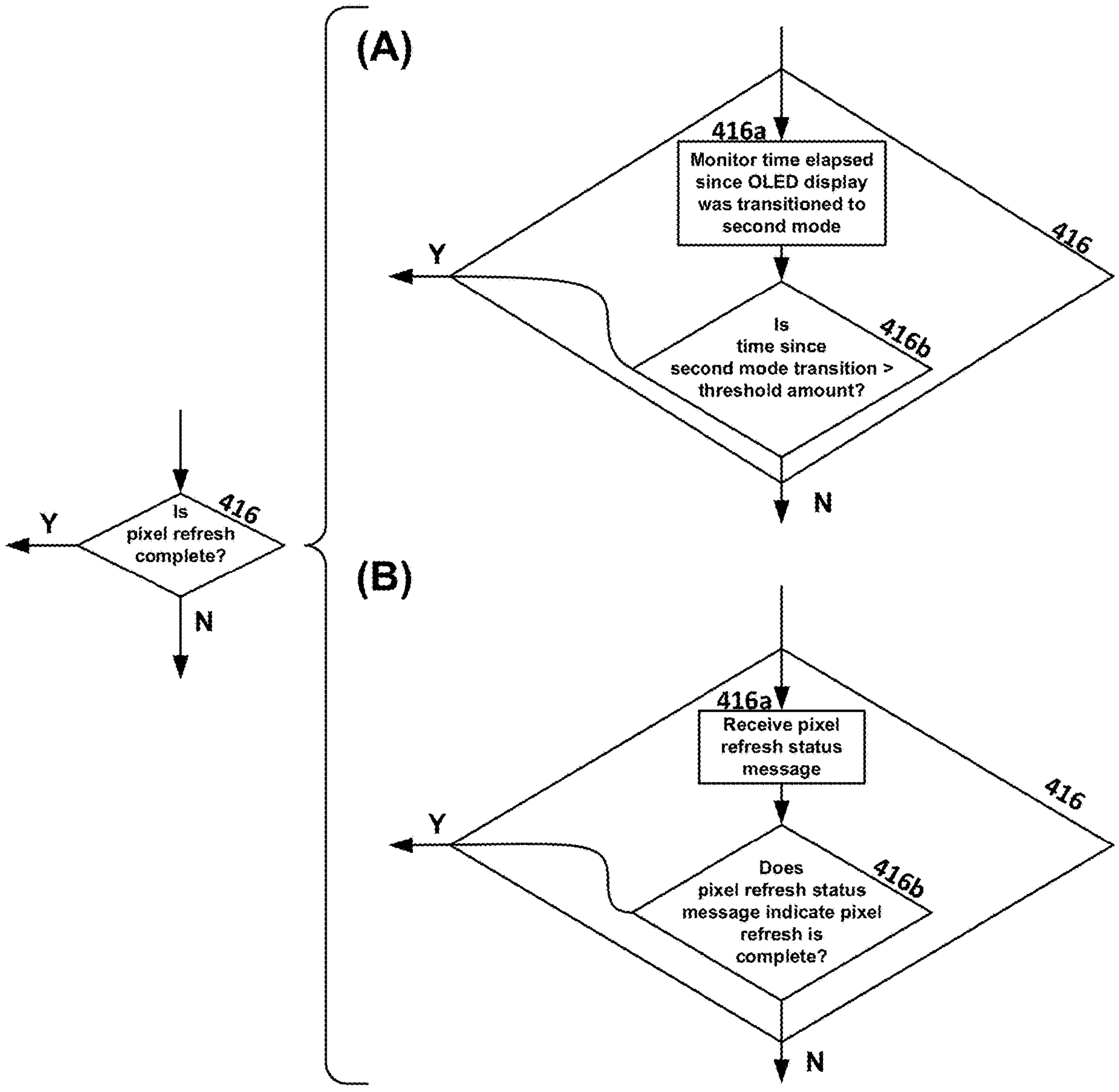
FIG. 5 depicts a block diagram of two alternative techniques for determining whether a pixel refresh routine has completed.

The one or more processors may determine that performance of the pixel refresh routine has completed in a number of ways. FIG. 5, for example, depicts a block diagram of two alternative techniques for determining whether a pixel refresh routine has completed. For example, in some instances, a pixel refresh routine may operate for a known maximum or fixed duration, e.g., ten minutes, and may be known to initiate within 30 seconds of when the OLED display that it operates on is placed into an off, standby, suspend, and/or sleep state. In such an example, the one or more processors may simply monitor the amount of time elapsed since the OLED display was transitioned to the second mode and then determine that the performance of the pixel refresh routine is complete when the elapsed time equals the known maximum duration of the OLED display plus the known maximum delay after the OLED display is transitioned to the second mode before the performance of the pixel refresh routine is initiated. The duration of the time window between transitions from the first mode to the second mode and then back to the first mode from the second mode may be selected using alternate rules as well, although such a time window will generally be at least as long as the duration of the pixel refresh routine and may be up to 1.1 times the duration of the pixel refresh routine (or may be as long as the duration of the pixel refresh routine plus some amount of cushion) in some implementations. However, the additional time beyond the duration of the pixel refresh routine may generally be selected to be on the order of a few minutes, e.g., long enough to account for potential uncertainty in the length of the pixel refresh routine and/or variance in when the pixel refresh routine is initiated once the OLED is transitioned to the second mode but generally minimizing the amount of time that the OLED is in the second mode (and thus generally maximizing the amount of time that the OLED is in the first mode). This is illustrated in FIG. 5, option (A), in which the block 416 of FIG. 4 is shown with two sub-blocks 416*a* and 416*b*. In block 416*a*, the time that has elapsed since the OLED display was transitioned to the second mode (thus causing the pixel refresh mode to be initiated) is monitored or checked, and then in block 416*b*, a determination is made if the time elapsed since the OLED display was transitioned to the second mode exceeds a threshold amount. If the time elapsed since the OLED display was transitioned to the second mode exceeds the threshold amount, then the block 416 follows the "Y" path. If the time elapsed since the OLED display was transitioned to the second mode exceeds does not exceed the threshold amount, then the block 416 follows the "N" path.

In other instances, the OLED display may provide an output signal to the one or more processors on completion of performance of the pixel refresh routine indicating that the pixel refresh routine has completed. The one or more processors, on receipt of such a signal, may then determine that the pixel refresh routine has completed. FIG. 5, option (B) depicts such an alternative technique. For example, in the block 416 of option (B), a pixel refresh status message may be received indicating whether or not the pixel refresh routine is complete. Such a message may, for example, be received in response to a request sent to an API that may allow for data to be obtained regarding OLED display status. Alternatively, such a message may be proactively sent out by such an API once the pixel refresh routine is complete, in which case the absence of such a message may be interpreted as being a status message that the pixel refresh routine is not yet complete. In block 416*b* of option (B), a determination is made if the pixel refresh status message indicates that the pixel refresh routine is complete. If the pixel refresh status message indicates that the pixel refresh routine is complete, then the block 416 follows the "Y" path. If the pixel refresh status message does not indicate that the pixel refresh routine is complete, then the block 416 follows the "N" path.

In electronic gaming machines that have multiple OLED displays, such OLED displays may be caused by the one or more processors to transition from the first mode to the second mode simultaneously, or at least such that two or more (or, in some cases, all) of such OLED displays are in the second mode at least partially at the same time. In other words, such that the performance of the pixel refresh routines for such OLED displays overlap at least partially in time. In particular, it may be advantageous to time the mode transitions of such OLED displays such that both OLED displays (if there are two OLED displays in an electronic gaming machine) or at least two of the OLED displays (if more than two OLED displays in the electronic gaming machine) perform their pixel refresh routines such that one pixel refresh routine overlaps entirely, or by at least 80% or 90%, with the other pixel refresh routine. If the transitions to the second mode for multiple OLED displays of an electronic gaming machine are managed in this manner, it will avoid a scenario in which there are multiple pixel refresh routines for different OLED displays of the electronic gaming machine that are run in a sequential fashion. This helps reduce the total period of time in which the electronic gaming machine is engaged in performing pixel refresh routines and increases the amount of time that the electronic gaming machine is in the first mode and displaying graphical content.

Figure 6:
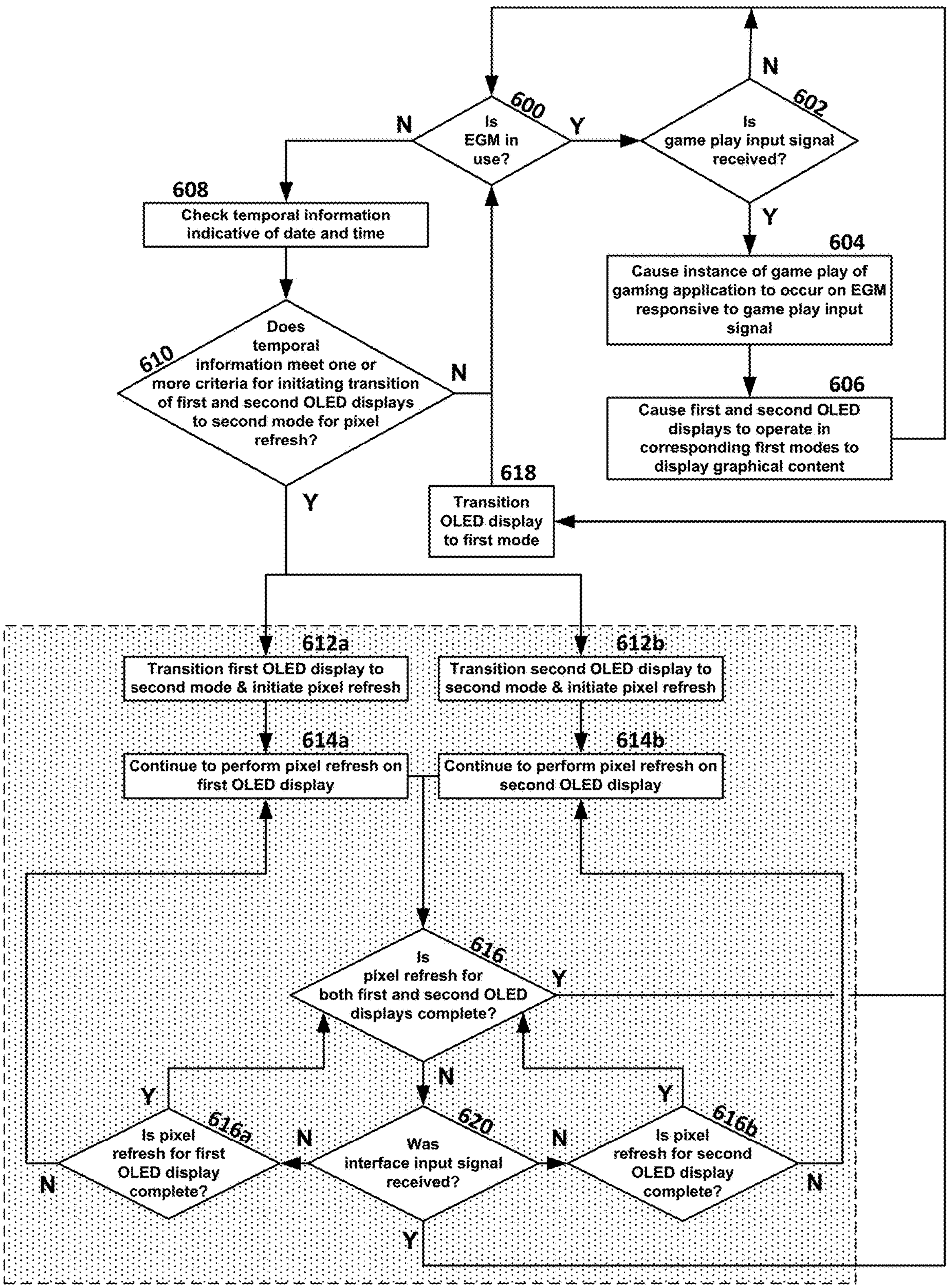
FIG. 6 depicts a block diagram of a technique for performing OLED display pixel refreshes on an electronic gaming machine with two OLED displays at least partially simultaneously.

FIG. 6 depicts a block diagram of a technique for performing OLED display pixel refreshes on two OLED displays of an electronic gaming machine at least partially simultaneously. In FIG. 6, as in FIG. 4, an electronic gaming machine may cycle through various aspects of the depicted technique over time, but the technique may, for each cycle, start with block 600, in which the electronic gaming machine may make a determination as to whether the electronic gaming machine is in use by a player. If it is determined in block 600 that the electronic gaming machine is in use by a player, the technique may proceed to block 602, in which a further determination may be made as to whether a game play input signal indicating a play of a game offered by the electronic gaming machine has been received from the button deck of the electronic gaming machine (or from some other source). If it is determined in block 602 that such a game play input signal has not been received, the technique may return to block 600. However, if it is determined in block 602 that the game play input signal has been received, then the technique may proceed to block 604, in which an instance of game play of a gaming application may be caused to occur responsive to receipt of the game play input signal. The electronic gaming machine may then, in block 606, cause the OLED displays of the electronic gaming machine to operate in the first mode to display graphical content, e.g., first graphical content on the first OLED display and second graphical content on the second OLED display, for the gaming application before returning to block 600.

If it is determined in block 600 that the electronic gaming machine is no longer in use by a player, the technique may instead proceed to block 608, in which the electronic gaming machine may check temporal information. The technique may then proceed to block 610, in which a determination may be made as to whether the temporal information meets one or more criteria for triggering or initiating a transition of the OLED displays from the first mode to the second mode (thus causing pixel refresh routines to be performed on the OLED displays). If it is determined in block 610 that the one or more criteria for initiating a transition to the second mode are not met, then the technique may return to block 600. However, if it is determined in block 610 that the one or more criteria for initiating a transition to the second mode are met, then the technique may proceed to blocks 612*a* and 612*b*, in which the first OLED display and the second OLED display, respectively, may be caused to transition to the second mode, thus initiating the pixel refresh routines on both OLED displays.

In blocks 614*a* and 614*b*, the pixel refresh routines initiated in blocks 612*a* and 612*b*, respectively, may continue to be performed. It will be noted that the blocks 612*a*, 612*b*, 614*a*, and 614*b* may be performed at least somewhat concurrently. In FIG. 6, they are performed in parallel, as indicated by the dashed rectangular shaded area surrounding them and the determination blocks 616, 616*a*, 616*b*, and 620.

In block 616, a determination may be made as to whether or not the pixel refresh routines for both OLED displays have completed. If it is determined in block 616 that the pixel refresh routines for both OLED displays are complete, the technique may proceed to block 618, in which the OLED display is caused to transition back to the first mode, before proceeding to return to block 600. However, if it is determined in block 616 that the pixel refresh routine is not yet complete, the technique may proceed to block 620, in which a determination may be made as to whether or not an interface input signal has been received. Such an interface input signal may, for example, be generated when a player pushes a button or taps a touch-screen control on the button deck, thereby signaling that a player potentially wishes to play on the electronic gaming machine. If it is determined in block 620 that the interface input signal has been received, the technique may proceed to block 618 in order to return the OLED display to the first mode before returning to block 600. If it is determined in block 620 that the interface input signal has not been received, the technique may proceed to blocks 616*a* and 616*b*, in which determinations may be made as to whether the pixel refresh routines for the first and second OLED displays, respectively, have completed. If it is determined in block 616*a* that the pixel refresh routine for the first OLED display has not yet completed, the relevant branch of the technique may return to block 614*a* to allow the pixel refresh routine for the first OLED display to continue to be performed. Similarly, if it is determined in block 616*b* that the pixel refresh routine for the second OLED display has not yet completed, the relevant branch of the technique may return to block 614*b* to allow the pixel refresh routine for the second OLED display to continue to be performed. If it is determined in either or both of blocks 616*a* or 616*b* that the pixel refresh routines for the first OLED display and the second OLED display, respectively, have completed, then the relevant branches of the technique may instead return to block 616.

As noted above, some electronic gaming machines may have multiple OLED displays. In such cases, different ordinal indicators may be used for each such OLED display, as well as for the modes that each such OLED display may operate in and the pixel refresh routines that may be performed on each such OLED display and the graphical content that may be displayed by such OLED displays. For example, in a two-OLED display electronic gaming machine, there may be a first OLED display and a second OLED display. The first OLED display may display first graphical content and the second OLED display may display second graphical content; the first graphical content and the second graphical content may be provided by the same application being executed by the electronic gaming machine and may form an integrated multimedia presentation despite being referenced as first and second graphical content. Similarly, the first OLED display and the second OLED display may be transitionable between a first mode and a second mode as discussed above, but the first mode and second mode for the second OLED display may, to avoid confusion about which OLED display is being referenced, be referred to as the third mode and the fourth mode, respectively. Additionally, the first OLED display and the second OLED display may both be operable to perform pixel refresh routines when in the second mode (or the second mode and fourth mode, respectively, according to the convention just discussed); such pixel refresh routines may be referred to as a first pixel refresh routine and a second pixel refresh routine, respectively. Such pixel refresh routines may be the same (if the first and second OLED displays are the same) or may be different, e.g., different in duration or the specific actions taken in each.

In some implementations, the one or more processors of an electronic gaming machine may be further configured to cause a message or notification to be provided while an OLED display of the electronic gaming machine is in the second mode by way of a display of the electronic gaming machine other than the OLED display (or displays) that is in the second mode. For example, the electronic gaming machine may include an auxiliary display, such as a virtual button deck display or a small display for a loyalty program or player tracking system, that may not be transitioned to a second mode at all (or at least not at the same time that the OLED displays in question are in the second mode). Such a notification may be a message that is associated with performance of the pixel refresh routine(s) on the OLED display(s) that is/are operating in the second mode. For example, such a message may indicate that the electronic gaming machine is performing routine maintenance and will be available for play once the maintenance is complete. The message may optionally provide an estimated total duration for such maintenance, e.g., "This gaming machine is performing routine maintenance that should last no longer than 10 minutes; it will be available for use once the maintenance is complete." In some instances, the message may, if appropriate, provide additional guidance to potential players, e.g., "This gaming machine is performing routine maintenance that should last no longer than 10 minutes; it will be available for use once maintenance is complete. However, if there are no other gaming machines available and you wish to start playing, pressing any button or control on the gaming machine will cause the routine maintenance to stop and will make the gaming machine available for your use." It will be understood that such messages may also be configured to provide little or no information on what the electronic gaming machine is doing, e.g., the electronic gaming machine may cause a message to be displayed that says "I'm taking a nap—wake me up if you want to play by pressing a button!" or "Catching some z's—I'll wake up in 9 minutes, but press a button to wake me up sooner!"

In some instances, the one or more processors may monitor an amount of time elapsed since an OLED display was transitioned to the second mode and may then, based on the elapsed time and an estimated or known duration of the pixel refresh routine (or of the OLED display being in the second mode), determine an amount of time before the OLED display will be transitioned back into the first mode from the second mode. The one or more processors may, in some such implementations, include information indicating, directly or indirectly, how much time remains before the OLED display transitions back to the first mode. In such implementations, the one or more processors may cause the message to be periodically or continuously updated to reflect the most recent determination of how much time remains before the OLED display transitions back into the first mode. For example, such a message may state "This gaming machine is performing routine maintenance that will complete in 4 minutes 39 seconds." The next second, the message may be changed to read "This gaming machine is performing routine maintenance that will complete in 4 minutes 38 seconds." And so forth.

Figure 7:
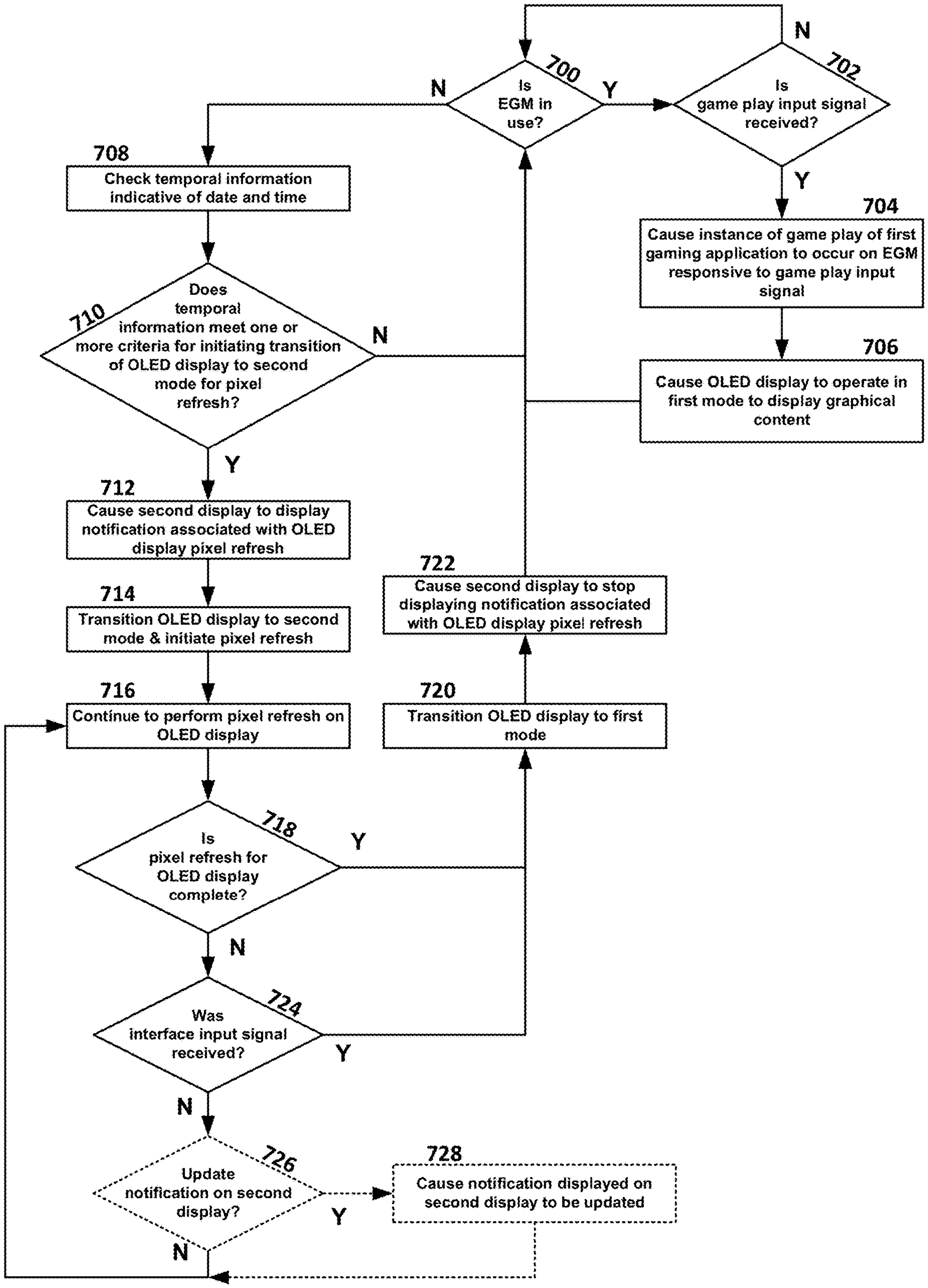
FIG. 7 depicts a block diagram of a technique for performing an OLED display pixel refresh on an electronic gaming machine while displaying a pixel-refresh-related notification.

FIG. 7 depicts a block diagram of a technique for performing an OLED display pixel refresh on an electronic gaming machine while displaying a pixel-refresh-related message or notification regarding the pixel refresh routine on another display of the electronic gaming machine.

In FIG. 7, as in FIGS. 4 and 6, an electronic gaming machine may cycle through various aspects of the depicted technique over time, but the technique may, for each cycle, start with block 700, in which the electronic gaming machine may make a determination as to whether the electronic gaming machine is in use by a player. If it is determined in block 700 that the electronic gaming machine is in use by a player, the technique may proceed to block 702, in which a further determination may be made as to whether a game play input signal indicating a play of a game offered by the electronic gaming machine has been received from the button deck of the electronic gaming machine (or from some other source). If it is determined in block 702 that such a game play input signal has not been received, the technique may return to block 700. However, if it is determined in block 702 that the game play input signal has been received, then the technique may proceed to block 704, in which an instance of game play of a gaming application may be caused to occur responsive to receipt of the game play input signal. The electronic gaming machine may then, in block 706, cause the OLED display or displays of the electronic gaming machine to operate in the first mode to display graphical content for the gaming application before returning to block 700.

If it is determined in block 700 that the electronic gaming machine is no longer in use by a player, the technique may instead proceed to block 708, in which the electronic gaming machine may check temporal information, and then block 710, in which a determination may be made as to whether the temporal information meets one or more criteria for triggering or initiating a transition of the OLED display from the first mode to the second mode (thus causing a pixel refresh routine to be performed). If it is determined in block 710 that the one or more criteria for initiating a transition to the second mode are not met, then the technique may return to block 700. However, if it is determined in block 710 that the one or more criteria for initiating a transition to the second mode are met, then the technique may proceed to block 712, in which another display of the electronic gaming machine may be caused to display a notification associated with the pixel refresh routine, and then block 714, in which the OLED display may be caused to transition to the second mode, thus initiating the pixel refresh routine on the OLED display. The notification that is caused to be displayed may, as noted above, include information indicating that the electronic gaming machine is not offline and is merely performing routine maintenance, e.g., a pixel refresh operation, and/or may be "woken up" for play by pressing a button or touch-screen control.

In block 716, the pixel refresh initiated in block 714 may continue to be performed. In block 718, a determination may be made as to whether or not the pixel refresh routine has completed. If it is determined in block 718 that the pixel refresh routine is complete, the technique may proceed to block 720, in which the OLED display is caused to transition back to the first mode, and to block 722, in which the other display is caused to stop displaying the notification from block 712, before proceeding to return to block 700. However, if it is determined in block 718 that the pixel refresh routine is not yet complete, the technique may proceed to block 724, in which a determination may be made as to whether or not an interface input signal has been received. If it is determined in block 724 that the interface input signal has been received, the technique may proceed to blocks 720 and 722 in order to return the OLED display to the first mode and to cause the notification to no longer be displayed on the other display before returning to block 700. If it is determined in block 724 that the interface input signal has not been received, the technique may optionally proceed to block 726, in which a determination may be made as to whether or not to update the notification on the other display, e.g., to reflect an updated amount of time remaining before the pixel refresh routine is complete. The electronic gaming machine may, for example, determine that the notification should be updated at regularly spaced time intervals, e.g., every 10, 20, or 30 seconds, or when the pixel refresh routine reaches certain preset degrees of completion, e.g., 10% complete, 20% complete, etc. If it is determined in block 726 that the notification should be updated, then the technique may flow to block 728, in which the other display may be caused to update the notification displayed thereon in order to include such new or changed information. Regardless of what determination is made in block 726, the technique may ultimately return to block 716 for further performance of the pixel refresh routine. In the event that the notification on the other display is not to be updated at all, then the technique may simply leave the notification unchanged.

In some implementations, the other display may also be an OLED display. In such implementations, after the technique of FIG. 7 is completed, it may be re-executed with the two displays swapped in their roles, thereby allowing pixel refreshes of both OLED displays to be performed.

In some implementations, an OLED display may be configured to allow two or more discrete regions of the OLED display to be put into the second mode independently of the other(s). In such OLED displays, the region or regions of the OLED display that are not in the second mode may be kept in the first mode. In such implementations, pixel refresh routines may be performed for different regions of an OLED display at different times while the other region or regions of the OLED display continue to display graphical content.

Figure 8:
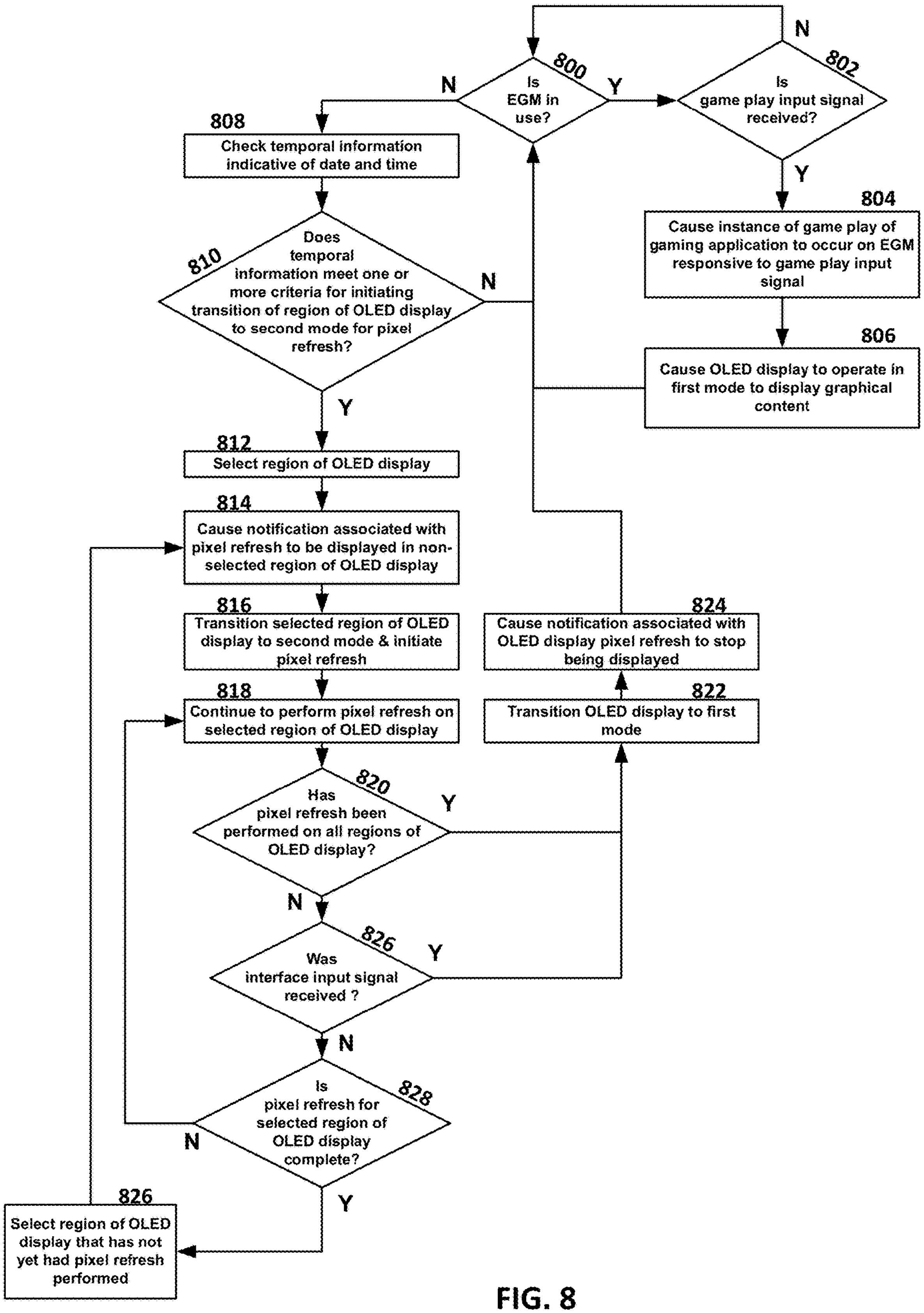
FIG. 8 depicts a block diagram of a technique for performing a pixel refresh across multiple regions of an OLED display in an electronic gaming machine.

FIG. 8 depicts a block diagram of a technique for performing a pixel refresh across multiple regions of an OLED display in an electronic gaming machine.

In FIG. 8, as in FIGS. 4, 6, and 7, an electronic gaming machine may cycle through various aspects of the depicted technique over time, but the technique may, for each cycle, start with block 800, in which the electronic gaming machine may make a determination as to whether the electronic gaming machine is in use by a player. If it is determined in block 800 that the electronic gaming machine is in use by a player, the technique may proceed to block 802, in which a further determination may be made as to whether a game play input signal indicating a play of a game offered by the electronic gaming machine has been received from the button deck of the electronic gaming machine (or from some other source). If it is determined in block 802 that such a game play input signal has not been received, the technique may return to block 800. However, if it is determined in block 802 that the game play input signal has been received, then the technique may proceed to block 804, in which an instance of game play of a gaming application may be caused to occur responsive to receipt of the game play input signal. The electronic gaming machine may then, in block 806, cause the OLED display or displays of the electronic gaming machine to operate in the first mode to display graphical content for the gaming application before returning to block 800.

If it is determined in block 800 that the electronic gaming machine is no longer in use by a player, the technique may instead proceed to block 808, in which the electronic gaming machine may check temporal information, and then block 810, in which a determination may be made as to whether the temporal information meets one or more criteria for triggering or initiating a transition of a region of the OLED display from the first mode to the second mode (thus causing a pixel refresh routine to be performed in that region). If it is determined in block 810 that the one or more criteria for initiating a transition to the second mode are not met, then the technique may return to block 800. However, if it is determined in block 810 that the one or more criteria for initiating a transition to the second mode are met, then the technique may proceed to block 812, in which a region of the OLED display may be selected. In block 814, a notification may (optionally) be caused to be displayed on a region of the OLED display other than the selected region; such a notification may, for example, be similar to the notifications presented via the technique of FIG. 7 and may inform onlookers that the electronic gaming machine is in the middle of performing pixel refresh routines (or, more generally, maintenance operations).

The technique may then proceed to block 816, in which the selected region of the OLED display may be caused to transition from the first mode to the second mode, thereby causing a pixel refresh routine to be initiated for the selected region of the OLED display. The technique may continue to block 818, in which the pixel refresh routine may continue to be performed for the selected region of the OLED display.

In block 820, a determination may be made as to whether or not the pixel refresh routine for all regions of the OLED display have been completed. If it is determined in block 820 that the pixel refresh routines for all of the regions of the OLED display have been completed, the technique may proceed to block 822, in which any region of the OLED display that is in the second mode is caused to transition back to the first mode, and then to block 824, in which the region(s) of the OLED display displaying the notification (if shown) from block 814 may be caused to stop displaying the notification, before proceeding to return to block 800.

However, if it is determined in block 820 that the pixel refresh routine has not yet been completed for all of the regions of the OLED display, the technique may proceed to block 826, in which a determination may be made as to whether or not an interface input signal has been received. If it is determined in block 826 that the interface input signal has been received, the technique may proceed to blocks 822 and 824 in order to return any region of the OLED display that is in the second mode to the first mode and to cause the notification to no longer be displayed on the OLED display before returning to block 800. If it is determined in block 826 that the interface input signal has not been received, the technique may then proceed to block 828, in which a determination may be made as to whether or not the pixel refresh routine for the selected region of the OLED display has been completed. If it is determined in block 828 that the pixel refresh routine for the selected region of the OLED display has not been completed, then the technique may return to block 818 for further performance of the pixel refresh routine on the selected region of the OLED display. If it is determined in block 828 that the pixel refresh routine for the selected region of the OLED display has been completed, then the technique may proceed to block 830, in which a new region of the OLED display that has not yet had a pixel refresh routine performed during this particular set of region pixel refreshes for the OLED display may be selected as the selected region. The technique may then return to block 818 and continue to perform the various blocks 818, 820, 826, and 828 with the newly selected region.

In yet other implementations, the electronic gaming machine may be equipped with various sensors that may be used to provide data that may be used in determining whether or not to initiate a pixel refresh routine on one or more OLED displays of the electronic gaming machine. For example, an electronic gaming machine may be equipped with one or more sensors, such as one or more proximity sensors configured to detect the presence of one or more people (or potential people) within a given area around the electronic gaming machine and/or one or more imaging sensors, such as cameras, that are configured to obtain image data regarding a given area around the electronic gaming machine. Such data may then be used by the electronic gaming machine to determine whether or not there is a high probability of the electronic gaming machine being directly observed by one or more bystanders or potential players; if so, then the pixel refresh routine that might otherwise be caused to occur may instead be delayed so as to occur when fewer (or no) potential observers are present.

Figure 9:
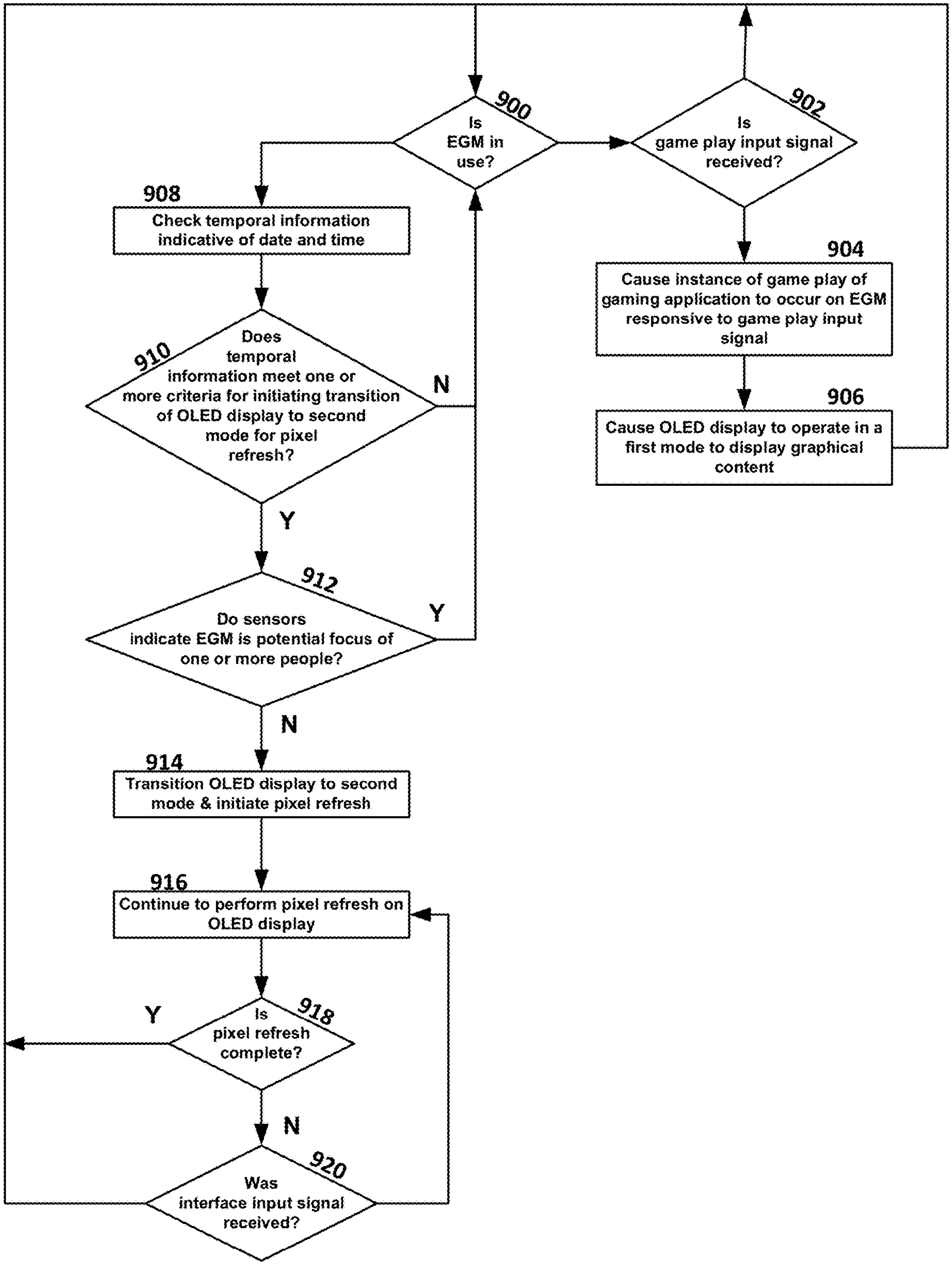
FIG. 9 depicts a block diagram of a technique for performing a pixel refresh under conditions satisfying one or more criteria based on data from one or more proximity or imaging sensors.

FIG. 9 depicts a block diagram of a technique for performing a pixel refresh under conditions satisfying one or more criteria based on data from one or more proximity or imaging sensors.

In FIG. 9, as in FIGS. 4, 6, 7, and 8, an electronic gaming machine may cycle through various aspects of the depicted technique over time, but the technique may, for each cycle, start with block 900, in which the electronic gaming machine may make a determination as to whether the electronic gaming machine is in use by a player. If it is determined in block 900 that the electronic gaming machine is in use by a player, the technique may proceed to block 902, in which a further determination may be made as to whether a game play input signal indicating a play of a game offered by the electronic gaming machine has been received from the button deck of the electronic gaming machine (or from some other source). If it is determined in block 902 that such a game play input signal has not been received, the technique may return to block 900. However, if it is determined in block 902 that the game play input signal has been received, then the technique may proceed to block 904, in which an instance of game play of a gaming application may be caused to occur responsive to receipt of the game play input signal. The electronic gaming machine may then, in block 906, cause the OLED display or displays of the electronic gaming machine to operate in the first mode to display graphical content for the gaming application before returning to block 900.

If it is determined in block 900 that the electronic gaming machine is no longer in use by a player, the technique may instead proceed to block 908, in which the electronic gaming machine may check temporal information, and then block 910, in which a determination may be made as to whether the temporal information meets one or more criteria for triggering or initiating a transition of a region of the OLED display from the first mode to the second mode (thus causing a pixel refresh routine to be performed in that region). If it is determined in block 910 that the one or more criteria for initiating a transition to the second mode are not met, then the technique may return to block 900. However, if it is determined in block 910 that the one or more criteria for initiating a transition to the second mode are met, then the technique may proceed to block 912, in which a determination may be made as to whether one or more criteria are met, based on data from one or more proximity sensors and/or one or more imaging sensors of the electronic gaming machine, as to whether or not the electronic gaming machine is likely to be the potential focus of one or more people. Such criteria may, for example, include satisfaction of a set of one or more proximity conditions and/or a set of one or more imaging conditions.

For example, if the electronic gaming machine has one or more proximity sensors, the data from such proximity sensors may be analyzed by one or more processors of the electronic gaming machine in order to identify potential proximity events that occur within a particular region associated with the electronic gaming machine, e.g., a rectangular region in front of the electronic gaming machine that is approximately 5 feet wide and 10 feet deep. The region may, for example, be defined so as to encompass an area in which it is felt that potential onlookers, if present in the region, would be likely to notice or be looking at the electronic gaming machine. In other implementations, the region may be much larger in size, e.g., a semicircular region in front of the electronic gaming machine that extends to 15 feet from the center of the electronic gaming machine. In such implementations, the electronic gaming machine may check to see how many people (based on the number of proximity detection events that appear to represent people) are located within the region and may then, if that number is less than an associated threshold (with the number of such detected people meeting or exceeding the threshold being an example of a set of one or more proximity conditions), determine that the electronic gaming machine is unlikely to be the focus of one or more people. If the number of people identified in the region based on the proximity data exceeds the threshold, then it may be determined that the electronic gaming machine is likely to be the focus of one or more people. The threshold number may, for example, be as low as one person in some cases, in which case the determination may be that the electronic gaming machine is unlikely to be the focus of any onlookers when there are zero people within the region and that the electronic gaming machine is likely to be the focus of one or more onlookers when there are any people within the region. In other implementations, higher thresholds may be used, e.g., 2, 3, 4, 5, 10, etc. people.

Figure 10:
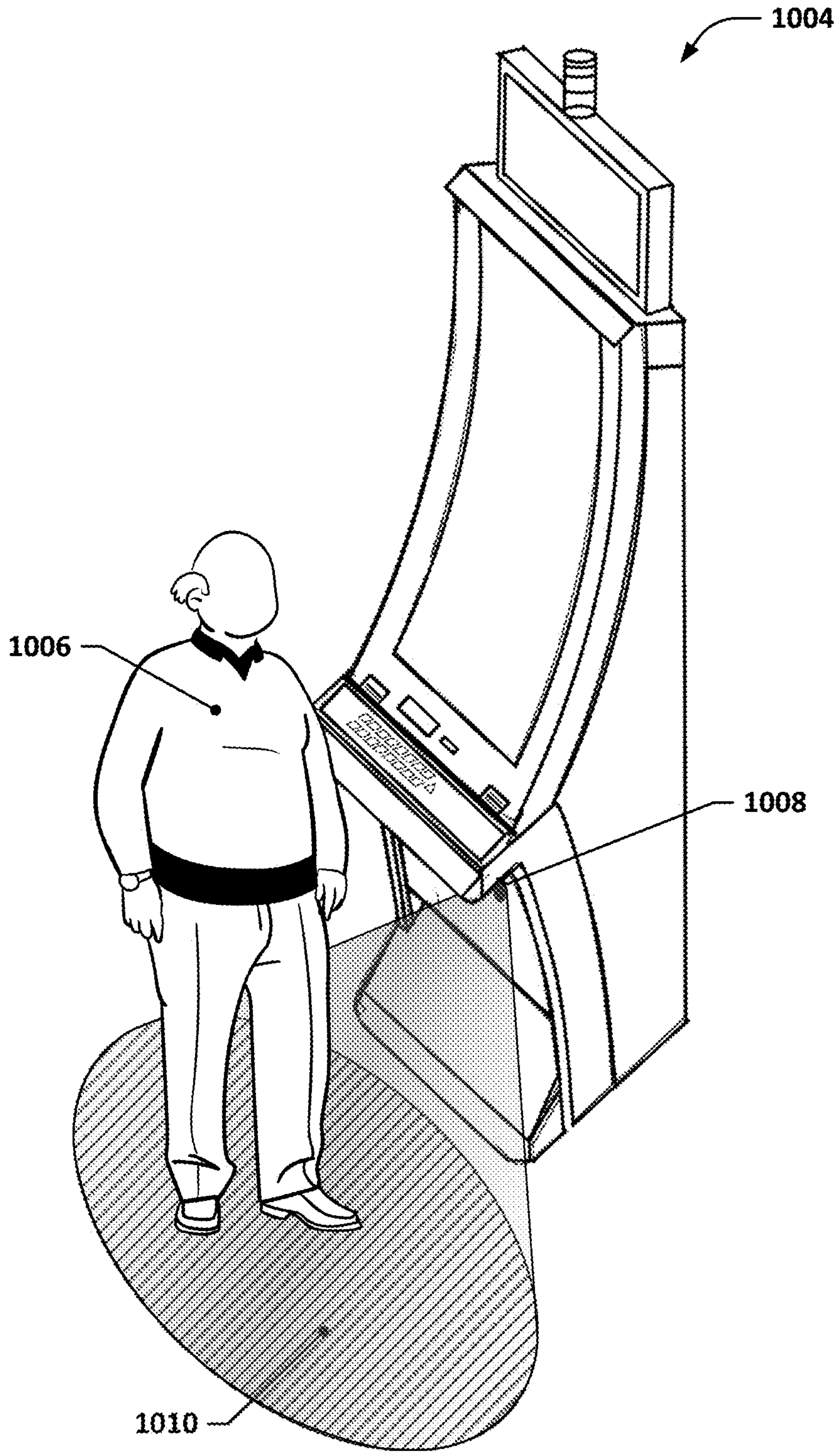
FIG. 10 depicts a diagram of an electronic gaming machine with a proximity detection sensor.

FIG. 10 depicts a diagram of an electronic gaming machine with a proximity detection sensor. As can be seen, an electronic gaming machine 1004 is shown that includes a proximity sensor 1008; the proximity sensor 1008 may be an infrared sensor, an ultrasonic proximity sensor, a lidar proximity sensor, a radar proximity sensor, or any other sensor suitable for detecting when one or more people may be within a particular area associated with the electronic gaming machine. In this example, the proximity sensor 1008 is configured to detect the presence of one or more people 1006 present within a region 1010 that is in front of the electronic gaming machine 1004. In some instances, the electronic gaming machine may determine that one or more proximity conditions are met when the proximity sensor 1008 detects no people within the region 1010. The region 1010 in some such implementations may extend to a distance of two feet from the electronic gaming machine, or at least the front of the electronic gaming machine. In some other contexts, the region 1010 may extend to a distance of three to four feet, or even six to eight feet of the electronic gaming machine (for example, electronic gaming machines with larger-format displays (that would be more noticeable at a distance/likely to be looked at from a distance) may be configured to detect potential onlookers within regions that extend away from, or are located further from, the electronic gaming machine.

In a further example, if an electronic gaming machine has one or more imaging sensors, e.g., digital cameras, the data from the one or more imaging sensors may be used in a similar manner, e.g., to identify a number of people (e.g., using object or person-detection algorithms) that are present within a given region visible in the data from the one or more imaging sensors. The use of imaging sensors, however, may also allow for more refined determinations to be made as to whether or not the electronic gaming machine is the focus of an onlooker. For example, facial and/or eye detection algorithms may be used to identify instances of people that are within a particular region and who may be directing their faces towards the electronic gaming machine. The number of such potential onlookers may be compared against a threshold number of such onlookers in order to make a determination of whether or not the electronic gaming machine is likely to be the potential focus of one or more people. In some instances, for example, if any people having faces turned towards or partially towards the electronic gaming machine are detected in the imaging data, then this may result in a determination that the electronic gaming machine is the potential focus of one or more people or onlookers. Conversely, if there are no people with their faces turned towards the electronic gaming machine within the region, then this may result in a determination that the electronic gaming machine is not the potential focus of one or more people or onlookers. Of course, such determinations may be based on threshold numbers of people and/or people with their faces turned towards the electronic gaming machine that are other than the cases discussed above, e.g., thresholds of 2, 3, 4, 5, 10, etc. people.

Figure 11:
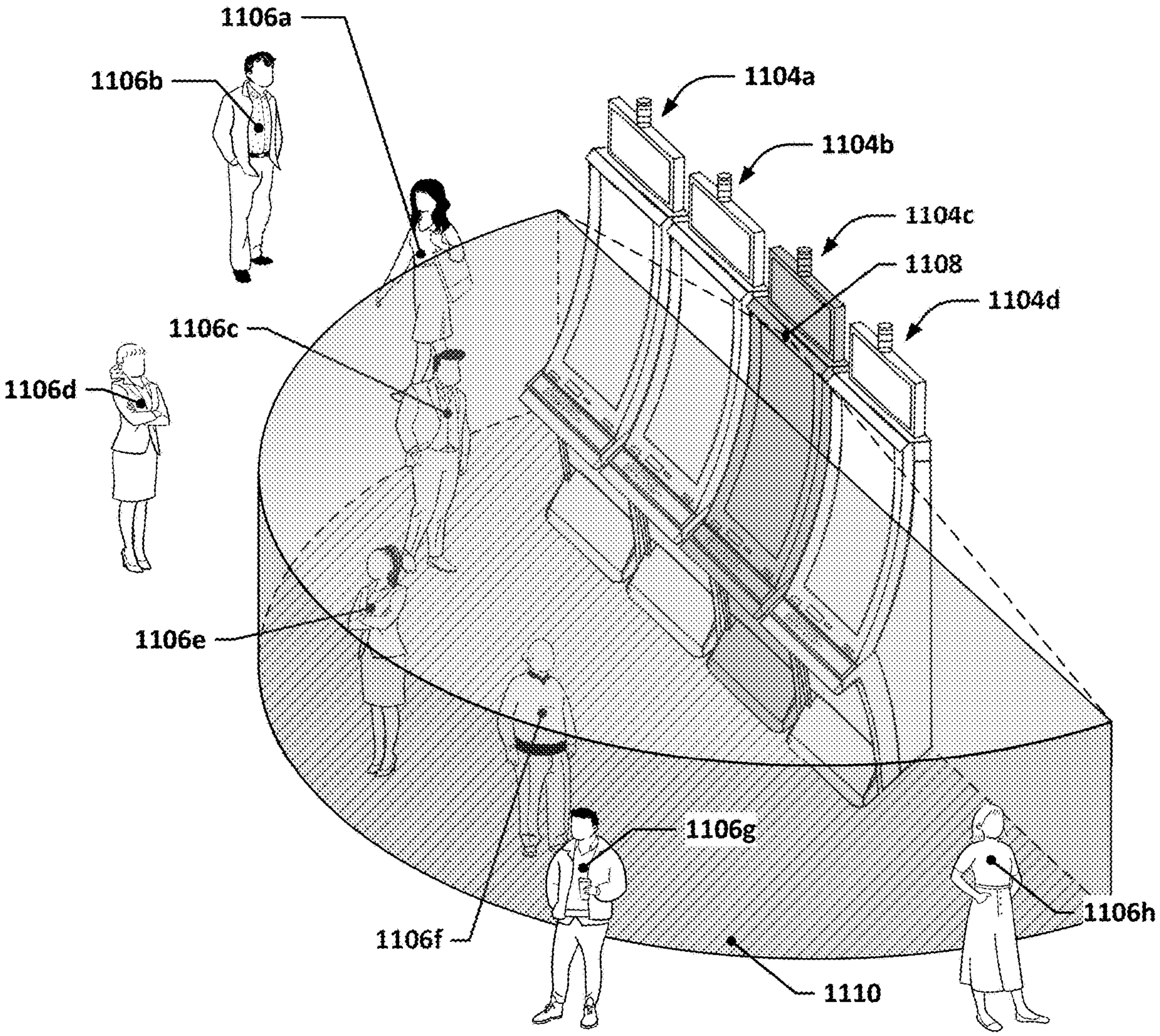
FIG. 11 depicts a diagram of an electronic gaming machine with an imaging sensor.

FIG. 11 depicts a diagram of a bank of four electronic gaming machines 1104*a*, 1104*b*, 1104*c*, and 1104*d*. The electronic gaming machine 1104*c* includes an imaging sensor 1108. The imaging sensor 1108 may, for example, be a digital camera utilizing a charge-coupled device (CCD) imaging chip, a complementary metal-oxide semiconductor (CMOS) imaging chip, etc. and may be equipped with any of a variety of different lenses depending on the region 1110 that the imaging sensor 1108 is intended to collect data from. In this example, the imaging sensor 1108 is equipped with a fisheye lens that allows the imaging sensor 1108 to survey a semicircular region 1110 in front of the electronic gaming machine 1104. The electronic gaming machine may be configured to use object/person recognition algorithms to analyze the image data that is obtained from the imaging sensor 1108 and detect the presence of people within the region 1110. In this case, the image data reflects the presence of people 1106*c*, 1106*e*, and 1106*f* of people 1106*a* through 1106*h* in the region 1110. Thus, if the electronic gaming machine is configured to determine that the electronic gaming machine is potentially the focus of someone's attention when there are three or more individuals within the region 1110 (an example of a set of one or more imaging conditions), then the presence of these three individuals within the region 1110 would result in the electronic gaming machine determining that it was likely the focus of someone's attention. If the person 1106*f* were to walk out of the region 1110 (without anyone else wandering into the region 1110), however, the electronic gaming machine may then determine that it is not the focus of anyone's attention since the number of people within the region (two) is below three.

If the electronic gaming machine 1104 is additionally configured for facial or eye detection, e.g., to detect when people are looking towards the imaging sensor 1108, then the determination as to whether or not the electronic gaming machine 1104 is the focus of someone's attention may be based on, for example, the number of people detected within the region 1110 that are facing towards the electronic gaming machine 1104. In the depicted example, such facial or eye detection may detect that person 1106*c* is facing towards the electronic gaming machine 1104*c*, whereas people 1106*e* and 1106*f* are within the region 1110 but facing away from the electronic gaming machine 1104*c*. In implementations in which the electronic gaming machine 1104*c* employs facial detection or eye detection, the electronic gaming machine 1104*c* may adopt a more stringent approach to determining if it is the focus of someone's attention. For example, the electronic gaming machine 1104*c* may determine that it is the focus of someone's attention if even one person, such as the person 1106*c*, is facing towards the electronic gaming machine 1104*c*.

Returning to the technique of FIG. 9, if it is determined in block 912 that the data from the proximity and/or imaging sensors indicates that the electronic gaming machine is likely to be the focus of one or more people, as described above, the technique may return to block 900, thus avoiding the initiation of a pixel refresh routine when the electronic gaming machine may have a heightened chance of being observed by bystanders or potential players. If it is determined in block 912 that the data from the proximity and/or imaging sensors indicates that the electronic gaming machine is not likely to be the focus of one or more people, as described above, then the technique may continue to block 914, in which the OLED display may be caused to transition to the second mode, thus initiating the pixel refresh routine on the OLED display.

In block 916, the pixel refresh initiated in block 914 may continue to be performed. In block 918, a determination may be made as to whether or not the pixel refresh routine has completed. If it is determined in block 918 that the pixel refresh routine is complete, the technique may proceed to block 920, in which the OLED display is caused to transition back to the first mode, before proceeding to return to block 900. However, if it is determined in block 918 that the pixel refresh routine is not yet complete, the technique may proceed to block 922, in which a determination may be made as to whether or not an interface input signal has been received. Such an interface input signal may, for example, be generated when a player pushes a button or taps a touch-screen control on the button deck, thereby signaling that a player potentially wishes to play on the electronic gaming machine. If it is determined in block 922 that the interface input signal has been received, the technique may proceed to block 920 in order to return the OLED display to the first mode before returning to block 900. If it is determined in block 922 that the interface input signal has not been received, the technique may return to block 916, thus allowing the pixel refresh routine to continue to be performed.

In a variant of such a technique, the electronic gaming machine may continue to evaluate whether or not the electronic gaming machine is the focus of one or more people, e.g., as discussed above. Such ongoing evaluations may, for example, be done in place of, or concurrently with, block 922. If the electronic gaming machine determines during such an ongoing evaluation that the electronic gaming machine is likely the focus of one or more people, the electronic gaming machine may cause the pixel refresh mode to conclude (even if not yet complete) and for the technique to proceed to block 920 and then back to block 900. In such a variant, the electronic gaming machine may, in effect, perform the pixel refresh furtively, e.g., when nobody is likely to be watching it, and may, when it determines that there may be an elevated risk that somebody is likely to see it, stop performing the pixel refresh and revert to using its OLED display(s) in the first mode to display graphics. The electronic gaming machine may then, if it later determines that the likelihood that the gaming machine is the focus of attention of one or more people is low enough, re-initiate the pixel refresh mode, e.g., as discussed below.

It will be understood that in systems in which a player (or the electronic gaming machine itself) is allowed to interrupt the performance of the pixel refresh routine and cause the OLED display(s) being subjected to the pixel refresh routine to revert back to the first mode of operation (e.g., to display game graphics), such systems may, similar to the example discussed earlier, cause the OLED display(s) to be transitioned back to the second mode (and either resume the pixel refresh routine where it left off or restart it entirely) after determining that the player has stopped using the electronic gaming machine (or determining that there is a sufficiently low chance that the electronic gaming machine may be the focus of any onlooker). This is similar to the example discussed earlier in which a player may be playing a game on the electronic gaming machine or otherwise using it at the time when an OLED display thereof would normally be transitioned to the second mode from the first mode. In some implementations in which the pixel refresh routine is able to be interrupted by a player, e.g., a player's interaction with the electronic gaming machine may cause the electronic gaming machine to revert the OLED display(s) back to the first mode in which graphical content is displayed, the one or more processors may be configured to monitor a total amount of time that the OLED display or each OLED display is in the second mode after the OLED display is initially transitioned into the second mode in order to perform the pixel refresh routine, e.g., according to a regular, recurring schedule. If the pixel refresh routine is prematurely ended, e.g., through player interruption, the one or more processors may, once it is determined that the player is no longer using the electronic gaming machine (and, if such functionality is implemented, if the current time is within a specified time window in which transitions to the second mode are permitted), cause the OLED display to revert back to the second mode to continue the pixel refresh routine. Put more broadly, in some implementations, the electronic gaming machine may cause an interrupted pixel refresh routine to be restarted automatically when a set of one or more pixel refresh restart conditions are met. Such conditions may, for example, include a set of one or more pixel refresh restart conditions that are met when a determination is made by one or more processors of the electronic gaming machine that the electronic gaming machine is no longer in use by a player, or that the electronic gaming machine has not been in use by a player for more than a predetermined period of time, such as five minutes (such sets of one or more pixel refresh restart conditions may also include temporal conditions, such as that the time of day must be within a specified range of times). The one or more controllers may then cause the OLED display to transition back to the first mode after a determination is made that the total amount of time that the OLED display spent in the second mode meets or exceeds the total amount of time needed to complete the pixel refresh routine, for example.

In some such implementations, the electronic gaming machine may periodically or continuously store information regarding the progress of the performance of a pixel refresh routine, e.g., which regions of an OLED display have successfully had a pixel refresh routine performed during the current pixel refresh routine for the OLED display or how long it has been since the pixel refresh routine being performed was started, in non-volatile memory. In such implementations, the electronic gaming machine or OLED display controller may, in the event of a system fault that occurs during the pixel refresh routine, reference the stored information upon being restarted or rebooted (or upon the OLED display being restarted or rebooted) and then restart the pixel refresh routine with the same completion or progress state it was in when the fault occurred (or, more correctly, in the same completion or progress state that the pixel refresh routine was in when the information stored in non-volatile member regarding the progress of the pixel refresh routine was last stored or saved). Thus, for example, if the electronic gaming machine experiences a fault during the performance of the pixel refresh routine that requires a reboot of the electronic gaming machine and the most recent information saved to non-volatile memory regarding the progress of that pixel refresh routine indicates that the pixel refresh routine was 35% complete, the electronic gaming machine may, on being rebooted, automatically cause the OLED display to re-enter the second mode to perform the pixel refresh routine but may initiate the pixel refresh routine in a state that is equivalent to the 35% completion state indicated in the information saved to the non-volatile memory.

It will be understood that the temporal information that the one or more processors uses to determine when to transition an OLED display into the second mode in order to perform a pixel refresh routine may be relatively simple, e.g., designating that the transition to the second mode be performed every day at the same time or every X days at the same time, but may also be more complex, e.g., having a generally recurring schedule but also having exceptions to that schedule. For example, such a schedule may be configured to generally trigger the second mode transition every weekday at 3:00 AM but also avoid any second mode transitions on weekend days since those may be days that see increased casino attendance, including in the early morning hours. In another example, such a schedule may have exceptions that prevent the second mode transition from occurring on holidays or during periods of time when special events, such as championship boxing tournaments, trade shows, or expos, may be occurring on the casino property or nearby, as there may also be increased attendance in the casino property during such events and it may be desirable to avoid performing pixel refresh routines at all during such heightened-attendance conditions.

In some implementations, the one or more controllers may be configured to store data relating to successful or unsuccessful performance of a pixel refresh routine in association with a particular time or window of time. For pixel refresh routines that are able to be re-started where they left off after interruption, successful performance of a pixel refresh routine within a given window of time occurs when the OLED display being refreshed is in the second mode for a total cumulative amount of time within that given window of time that is sufficiently long enough that the pixel refresh routine is able to complete (i.e., all pixels of the OLED display have been refreshed by the pixel refresh routine). For pixel refresh routines that must be restarted anew if terminated prematurely, successful performance of a pixel refresh routine within a given window of time occurs when the OLED display being refreshed is kept in the second mode, uninterrupted, for a period of time sufficient to complete the performance of the pixel refresh routine. Unsuccessful performance of a pixel refresh routine occurs when the time window during which the OLED display is allowed to be in the second mode expires and the pixel refresh routine has not refreshed all of the OLED display pixels. It will be understood that the time window during which the OLED display is allowed to be in the second mode will generally be longer than the time window during which the OLED display is allowed to be transitioned into the second mode, as it will generally accommodate situations in which the OLED display is transitioned into the second mode at the very end of the time window during which the OLED display is allowed to be transitioned into the second mode, but must then allow sufficient time for performance of the pixel refresh routine to complete.

In such implementations, the one or more processors may be further configured to, for example, adjust the schedule parameters that govern when the one or more processors may cause the OLED display(s) to transition to the second mode based on the data relating to successful or unsuccessful performance of a pixel refresh routine. For example, the one or more processors may determine how many times in a row the pixel refresh routine was unsuccessfully performed; if that number exceeds a threshold amount, e.g., three, four, five, six, etc., then the one or more processors may be configured to modify the parameters of the schedule to try and increase the chance that a successful performance of the pixel refresh routine occurs. For example, the one or more processors may increase the window of time during which the second mode transition may be performed and/or may shift when the window of time during which the second mode transition may be performed starts. In some such implementations, the one or more processors may analyze usage data stored on the electronic gaming machine to look for potential usage patterns and then, based on such usage patterns, adjust the schedule for causing the OLED display (s) to transition to the second mode. For example, the one or more processors of an electronic gaming machine may review usage data over a given time period, e.g., the last week, the last two weeks, the last three weeks, etc., in order to identify which days of the week and/or times of day, on average, have the lowest amount of usage of the electronic gaming machine (usage referring to situations where a player is actively using the electronic gaming machine to play a game or otherwise interact with the electronic gaming machine). The one or more processors may then modify the schedule for initiating the second mode transitions such that those transitions occur during periods of time in which the electronic gaming machine has been determined to historically see low usage.

Techniques such as the above may also be implemented in non-EGM devices that may nonetheless be subjected to similar operating conditions in a casino environment. For example, overhead or free-standing electronic signage may incorporate OLED displays and be operated in a manner similar to that described above (although without the need for features relating to allowing players to prematurely transition the OLED displays back to the second mode or presenting messages indicating that maintenance is being performed and/or how long such maintenance may take). In such implementations, the various techniques discussed above may, for example, omit elements pertaining to game play and/or use by a player.

It will also be understood that while the above discussion has focused on OLED display management for always-on devices in a casino gaming environment, such techniques may also be implemented in other devices that may have OLED displays that are in an always-on state (e.g., generally on for weeks or months at a time).

Finally, it will be understood that the various examples discussed above may be combined in various combinations, e.g., the techniques of FIGS. 4, 6, 7, 8, and 9 maybe combined to provide, for example, the technique of FIG. 6 in the context of the technique of FIG. 9, or the technique of FIG. 4, 6, 7, or 9 employed in combination with the technique of FIG. 8. All such combinations of techniques are considered within the scope of this disclosure. It will also be understood that the techniques discussed herein with respect to electronic gaming machines having two OLED displays may also be implemented in electronic gaming machines or other devices having more than two OLED displays, e.g., three OLED displays, four OLED displays, etc.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The term "between," as used herein and when used with a range of values, is to be understood, unless otherwise indicated, as being inclusive of the start and end values of that range. For example, between 1 and 5 is to be understood to be inclusive of the numbers 1, 2, 3, 4, and 5, not just the numbers 2, 3, and 4.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming machine comprising:
- a main cabinet;
- a first organic light-emitting diode (OLED) display, the first OLED display configured to be operable in at least a first mode in which graphical content is displayed by the first OLED display and a second mode in which a first pixel refresh routine is performed by the first OLED display;
- one or more processors; and
- one or more memory devices, the one or more memory devices storing computer-executable instructions which, when executed by the one or more processors, cause the one or more processors to:
  - cause an instance of game play of a gaming application to occur responsive, at least in part, to a game play input signal received by the one or more processors,
  - cause the first OLED display to, while operating in the first mode, display first graphical content,
  - determine whether a set of one or more temporal conditions have been met,
  - cause, responsive, at least in part, to at least the set of one or more temporal conditions being met, the first OLED display to transition from the first mode in which the first OLED display is displaying the first graphical content to the second mode,
  - determine that the performance of the first pixel refresh routine is complete by determining that a predetermined period of time has elapsed since the first OLED display was caused to transition from the first mode in which the first OLED display was displaying the first graphical content to the second mode in which the first pixel refresh routine is performed by the first OLED display, wherein the predetermined period of time is at least as long as a duration of the first pixel refresh routine and less than 1.1 times the duration of the first pixel refresh routine, and
  - cause the first OLED display to transition back to the first mode to further display the first graphical content responsive to determining that the performance of the first pixel refresh routine is complete or responsive to receipt of an interface input signal by the one or more processors while the first pixel refresh routine is being performed.

2. The electronic gaming machine of claim 1, wherein the one or more memory devices further store additional computer-executable instructions which, when executed by the one or more processors, cause the one or more processors to:
- alternatively determine that the performance of the first pixel refresh routine is complete based on receipt of a signal generated by the first OLED display indicating that the first pixel refresh routine is complete, and
- cause the first OLED display to transition back to the first mode to further display the first graphical content responsive to alternative determining that the performance of the first pixel refresh routine is complete based on receipt of the signal.

3. The electronic gaming machine of claim 1, further comprising a second OLED display, the second OLED display configured to be operable in at least a third mode in which graphical content is displayed by the second OLED display and a fourth mode in which a second pixel refresh routine is performed, wherein the one or more memory devices further store additional computer-executable instructions which, when executed by the one or more processors, cause the one or more processors to:
- cause second graphical content to be displayed on the second OLED display while the second OLED display is operating in the third mode;
- cause, based at least on the set of one or more temporal conditions being met, the second OLED display to transition from the third mode in which the second OLED display is displaying the second graphical content to the fourth mode such that the performance of the first pixel refresh routine and the second pixel refresh routine overlap at least partially in time; and
- cause the second OLED display to transition back to the third mode to further display the second graphical content after the performance of the second pixel refresh routine is determined to be complete or responsive to receipt of the interface input signal by the one or more processors while the second pixel refresh routine is being performed.

4. The electronic gaming machine of claim 1, further comprising a second display, wherein the one or more memory devices further store additional computer-executable instructions which, when executed by the one or more processors, cause the one or more processors to cause the second display to display a message associated with the performance of the first pixel refresh routine and while the first pixel refresh routine is being performed.

5. The electronic gaming machine of claim 4, wherein:
- the message includes information that indicates, directly or indirectly, approximately how long until the first OLED display will be transitioned back into the first mode from the second mode, and
- the one or more memory devices further store further additional computer-executable instructions which, when executed by the one or more processors, cause the one or more processors to update the message on a continuous or periodic basis while the first OLED display is in the second mode.

6. The electronic gaming machine of claim 4, further comprising a button deck, wherein the message also includes content that directly or indirectly indicates that the first OLED display can be restored to the first mode in which the first graphical content is displayed by providing an input via the button deck.

7. The electronic gaming machine of claim 1, wherein the set of one or more temporal conditions is met when a first time of day in the time zone in which the electronic gaming machine is located is a time between 2:00 in the morning and 6:00 in the morning in that time zone.

8. The electronic gaming machine of claim 1, further comprising one or more proximity sensors, wherein the one or more memory devices further store additional computer-executable instructions which, when executed by the one or more processors, cause the one or more processors to:

determine whether a set of one or more proximity conditions have been met based on data received from the one or more proximity sensors, and cause, responsive, at least in part, to the set of one or more proximity conditions being met in association with the set of one or more temporal conditions being met, the first OLED display to transition from the first mode in which the first OLED display is displaying the first graphical content to the second mode.

9. The electronic gaming machine of claim 8, wherein the set of the one or more proximity conditions is met, at least in part, when the data from the one or more proximity sensors indicates that less than a threshold number of people are within a first area associated with the electronic gaming machine.

10. The electronic gaming machine of claim 8, wherein the set of the one or more proximity conditions is met, at least in part, when the data from the one or more proximity sensors indicates that no people are within a first area associated with the electronic gaming machine.

11. The electronic gaming machine of claim 10, wherein the set of the one or more proximity conditions is met, at least in part, when the data from the one or more proximity sensors indicates that no people are within eight feet of the electronic gaming machine.

12. The electronic gaming machine of claim 1, further comprising one or more imaging sensors, wherein the one or more memory devices further store additional computer-executable instructions which, when executed by the one or more processors, cause the one or more processors to:

determine whether a set of one or more imaging conditions have been met based on data received from the one or more imaging sensors, and cause, responsive, at least in part, to the set of one or more imaging conditions being met in association with the set of one or more temporal conditions being met, the first OLED display to transition from the first mode in which the first OLED display is displaying the first graphical content to the second mode.

13. The electronic gaming machine of claim 12, wherein the set of one or more imaging conditions is met when the data from the one or more imaging sensors indicates that less than a threshold number of people within a first area have faces oriented towards the electronic gaming machine.

14. The electronic gaming machine of claim 12, wherein the set of one or more imaging conditions is met when the data from the one or more imaging sensors indicates that no people within a first area are looking at the electronic gaming machine.

15. The electronic gaming machine of claim 1, wherein the one or more memory devices further store additional computer-executable instructions which, when executed by the one or more processors, cause the one or more processors to cause, responsive to the first OLED display being caused to transition from the second mode to the first mode responsive to the receipt of the interface input signal while the first pixel refresh routine is being performed and to determining that a set of one or more pixel refresh restart conditions are met, the first OLED display to transition from the first mode back to the second mode in order to restart the first pixel refresh routine.

16. The electronic gaming machine of claim 15, wherein the set of one or more pixel refresh restart conditions are met, at least in part, when a determination is made by the one or more processors that the electronic gaming machine is not in use by a player.

17. The electronic gaming machine of claim 1, wherein the one or more memory devices further store additional computer-executable instructions which, when executed by the one or more processors, cause the one or more processors to cause, responsive to the first OLED display being caused to transition from the second mode to the first mode responsive to the receipt of the interface input signal while the first pixel refresh routine is being performed and to determining that a set of one or more pixel refresh restart conditions are met, the first OLED display to transition from the first mode back to the second mode in order to perform more of the first pixel refresh routine.

18. The electronic gaming machine of claim 17, wherein the set of one or more pixel refresh restart conditions are met, at least in part, when a determination is made by the one or more processors that the electronic gaming machine is not in use by a player.

* * * * *